US006985814B2

(12) United States Patent
McElhinney

(10) Patent No.: US 6,985,814 B2
(45) Date of Patent: Jan. 10, 2006

(54) WELL TWINNING TECHNIQUES IN BOREHOLE SURVEYING

(75) Inventor: Graham McElhinney, Inverurie (GB)

(73) Assignee: PathFinder Energy Services, Inc., Houston, TX (US)

( * ) Notice: Subject to any disclaimer, the term of this patent is extended or adjusted under 35 U.S.C. 154(b) by 204 days.

(21) Appl. No.: 10/705,562

(22) Filed: Nov. 11, 2003

(65) Prior Publication Data

US 2004/0249573 A1 Dec. 9, 2004

(30) Foreign Application Priority Data

Jun. 9, 2003 (GB) .................................... 0313281

(51) Int. Cl.
*G01V 3/26* (2006.01)
(52) U.S. Cl. ................... 702/7; 175/45; 33/304
(58) Field of Classification Search ............... 702/7, 702/6, 10, 9; 33/304; 175/45; 166/255; 324/345, 346, 326, 330
See application file for complete search history.

(56) References Cited

U.S. PATENT DOCUMENTS

| 3,170,137 A | 2/1965 | Brandt ..................... 340/855.1 |
| 3,725,777 A | 4/1973 | Robinson et al. ........... 324/346 |
| 4,302,886 A | 12/1981 | Starr ........................... 33/317 |
| 4,909,336 A | 3/1990 | Brown et al. ................. 175/45 |
| 4,987,684 A | 1/1991 | Andreas et al. ............... 33/304 |
| 5,194,859 A | 3/1993 | Warren ..................... 340/853.4 |
| 5,220,963 A | 6/1993 | Patton .......................... 175/24 |
| 5,259,466 A | 11/1993 | Venditto et al. ........... 175/4.51 |
| 5,305,212 A * | 4/1994 | Kuckes .......................... 702/7 |
| 5,351,755 A | 10/1994 | Howlett ................... 166/255.2 |
| 5,415,238 A | 5/1995 | Nice .......................... 166/381 |
| 5,419,405 A | 5/1995 | Patton .......................... 175/27 |
| 5,439,064 A | 8/1995 | Patton .......................... 175/24 |
| 5,512,830 A | 4/1996 | Kuckes ....................... 324/346 |
| 5,589,775 A * | 12/1996 | Kuckes ....................... 324/346 |
| 5,657,826 A | 8/1997 | Kuckes ......................... 175/45 |
| 5,675,488 A | 10/1997 | McElhinney ................. 702/10 |

(Continued)

FOREIGN PATENT DOCUMENTS

EP 0682269 A2 11/1995

(Continued)

OTHER PUBLICATIONS

McElhinney, G.A., Margeirsson, A., Hamlin, K., and Blok, I., "Gravity MWD: A New Technique To Determine Your Well Path," 2000 IADC/SPE Drilling Conference, New Orleans, Louisiana, Feb. 23-25, 2000, IADC/SPE Paper No. 59200.

(Continued)

*Primary Examiner*—John Barlow
*Assistant Examiner*—Victor J. Taylor

(57) ABSTRACT

A method for surveying a borehole is provided. The method includes providing a tool having a magnetic field measurement device disposed thereon and positioning the tool in a borehole. Magnetic interference vectors are determined at at least two positions in the borehole by comparing the measured magnetic fields at those positions with a known magnetic field of the earth. The magnetic interference vectors indicate a direction to a target subterranean structure. Various embodiments of the invention compare the directions to the target subterranean structure with a historical survey thereof, so as to determine a distance between the borehole and the subterranean structure and an azimuth of the borehole. The surveying methodology of this invention may advantageously improve borehole surveying data obtained, for example, in relief well and/or well twinning drilling applications.

64 Claims, 8 Drawing Sheets

U.S. PATENT DOCUMENTS

| | | | |
|---|---|---|---|
| 5,842,149 A | 11/1998 | Harrell et al. | 702/9 |
| 5,996,711 A | 12/1999 | Ohmer | 702/9 |
| 6,003,599 A | 12/1999 | Huber et al. | 166/255.2 |
| 6,021,377 A | 2/2000 | Dubinsky et al. | 702/9 |
| 6,065,550 A | 5/2000 | Gardes | 175/62 |
| 6,092,610 A | 7/2000 | Kosmala et al. | 175/61 |
| 6,145,378 A | 11/2000 | McRobbie et al. | 73/490 |
| 6,173,773 B1 | 1/2001 | Almaguer et al. | 166/255.2 |
| 6,192,748 B1 | 2/2001 | Miller | 73/152.01 |
| 6,233,524 B1 | 5/2001 | Harrell et al. | 702/9 |
| 6,267,185 B1 | 7/2001 | Mougel et al. | 175/57 |
| 6,296,066 B1 | 10/2001 | Terry et al. | 175/92 |
| 6,315,062 B1 | 11/2001 | Alft et al. | 175/45 |
| 6,321,456 B1 | 11/2001 | McElhinnney | 33/313 |
| 6,453,239 B1 | 9/2002 | Shirasaka et al. | 701/220 |
| 6,470,976 B2 | 10/2002 | Alft et al. | 701/220 |
| 6,480,119 B1 | 11/2002 | McElhinney | 340/853.8 |
| 2002/0005286 A1 | 1/2002 | Mazorow et al. | 166/255.3 |
| 2002/0005297 A1 | 1/2002 | Alft et al. | 175/26 |
| 2002/0116130 A1 | 8/2002 | Estes et al. | 702/9 |
| 2002/0133958 A1 | 9/2002 | Noureldin et al. | 33/304 |
| 2002/0144417 A1 | 10/2002 | Russell et al. | 33/304 |

FOREIGN PATENT DOCUMENTS

| | | |
|---|---|---|
| GB | 2086055 A | 5/1982 |
| GB | 2321970 A | 8/1998 |
| GB | 2331811 A | 6/1999 |
| WO | WO-0011316 | 3/2000 |

OTHER PUBLICATIONS

Marketing material MagTraC 06-03 by Scientific Drilling available for download at http://www.scientificdrilling.com/pdf/magtrac%20overview.pdf.

Berger, P.E. and Sele, R., "Improving Wellbore Position Accuracy of Horizontal Wells by Using A Continuous Inclination Measurement From A Near Bit Inclination MWD Sensor," 1998 Society of Petroleum Engineers Annual Technical Conference on Horizontal Well Technology held in Calgary, Alberta, Canada, Nov. 1-4, 1998, SPE 50378.

McElhinney, Graham and Sognnes, Roar, "Case Histories Demonstrate A New Method For Well Avoidance And Relief Well Drilling," 1997 Society of Petroleum Engineers, SPE/IADC 37667, Richardson, Texas, U.S.A.

\* cited by examiner

FIG. 1
FIG. 3A
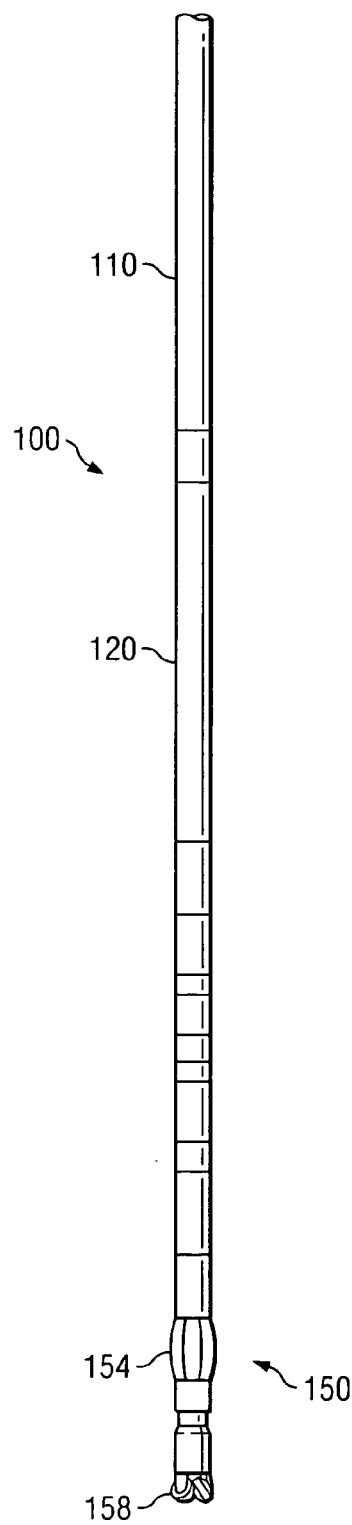
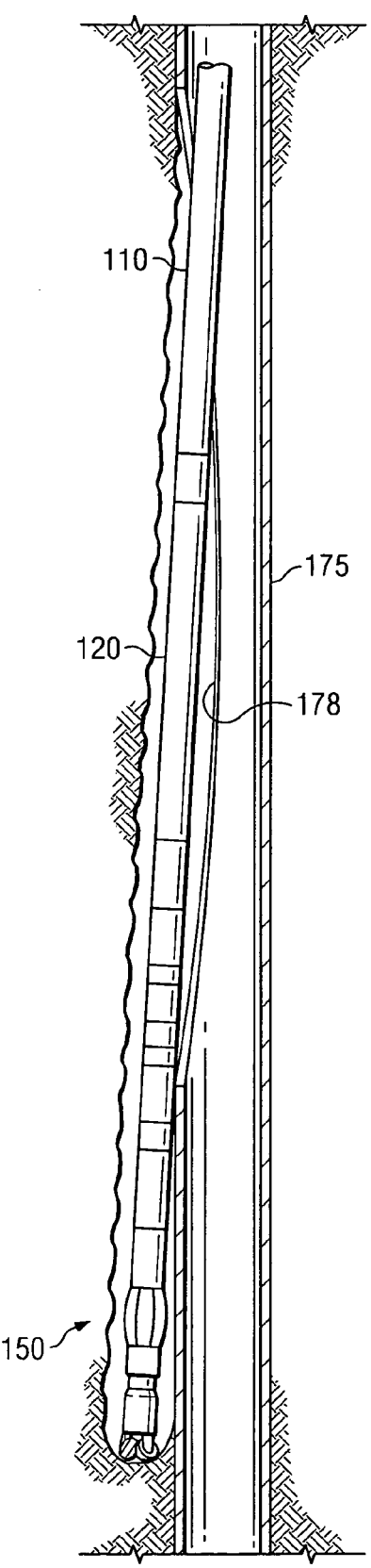

WELL TWINNING TECHNIQUES IN BOREHOLE SURVEYING

RELATED APPLICATIONS

This application claims priority to co-pending United Kingdom patent application no. 0313281.8, entitled WELL TWINNING TECHNIQUES IN BOREHOLE SURVEYING, filed Jun. 9, 2003.

FIELD OF THE INVENTION

The present invention relates generally to surveying a subterranean borehole to determine, for example, the path of the borehole. More particularly this invention relates to a method of passive ranging to determine directional and/or locational parameters of a borehole using sensors including one or more magnetic field measurement devices.

BACKGROUND OF THE INVENTION

The use of magnetic field measurement devices (e.g., magnetometers) in prior art subterranean surveying techniques for determining the direction of the earth's magnetic field at a particular point is well known. The use of accelerometers or gyroscopes in combination with one or more magnetometers to determine direction is also known. Deployments of such sensor sets are well known to determine borehole characteristics such as inclination, azimuth, positions in space, tool face rotation, magnetic tool face, and magnetic azimuth (i.e., an azimuth value determined from magnetic field measurements). While magnetometers are known to provide valuable information to the surveyor, their use in borehole surveying, and in particular measurement while drilling (MWD) applications, tends to be limited by various factors. For example, magnetic interference, such as from the magnetic steel components (e.g., liners, casings, etc.) of an adjacent borehole (also referred to as a target well herein) tends to interfere with the earth's magnetic field and thus may cause a deflection in the azimuth values obtained from a magnetometer set.

Passive ranging techniques may utilize such magnetic interference fields, for example, to help determine the location of an adjacent well (target well) to reduce the risk of collision and/or to place the well into a kill zone (e.g., near a well blow out where formation fluid is escaping to an adjacent well). U.S. Pat. No. 5,675,488 and U.S. patent application Ser. Nos. 10/368,257, 10/368,742, and 10/369,353 to McElhinney (herein referred to as the McElhinney patents) describe methods for determining the position of a target well with respect to a measured well (e.g., the well being drilled) in close proximity thereto. Such methods utilize three-dimensional magnetic interference vectors determined at a number of points in the measured well to determine azimuth and/or inclination of the target well and/or the distance from the measured well to the target well.

The methods described in the McElhinney patents have been shown to work well in a number of borehole surveying applications, such as, for example, well avoidance and or well kill applications. However, there remain certain other applications for which improved passive ranging techniques may advantageously be utilized. For example, well twinning applications (in particular in near horizontal well sections), in which a measured well is drilled essentially parallel to a target well, may benefit from such improved passive ranging techniques. Therefore, there exists a need for improved borehole surveying methods utilizing various passive ranging techniques.

SUMMARY OF THE INVENTION

Exemplary aspects of the present invention are intended to address the above described need for improved surveying methods utilizing various passive ranging techniques. Referring briefly to the accompanying figures, aspects of this invention include methods for surveying a borehole. Such methods make use of magnetic flux emanating from nearby magnetized subterranean structures (typically referred to herein as target wells), such as cased boreholes. Such magnetic flux may be passively measured to determine a direction and distance from the borehole being surveyed (also referred to herein as the measured well) to the target well. In various exemplary embodiments, the orientation of the measured well relative to the target well, the absolute coordinates, and the azimuth of the measured well may also be determined.

Exemplary embodiments of the present invention advantageously provide several technical advantages. For example, the direction and distance from a measured well to a target well may advantageously be determined without having to reposition the downhole tool in the measured well. Further, embodiments of this invention may be utilized to determine an azimuth value of the measured well. Such azimuth determination may be advantageous in certain drilling applications, such as in regions of magnetic interference where magnetic azimuth readings are often unreliable. Aspects of this invention may also advantageously be utilized in certain drilling applications, such as well twinning and/or relief well applications, to guide continued drilling of the measured well, for example, in a direction substantially parallel with the target well.

In one aspect the present invention includes a method for surveying a borehole. The method includes providing a downhole tool including first and second magnetic field measurement devices disposed at corresponding first and second positions in the borehole. The first and second positions are selected to be within sensor range of magnetic flux from a target subterranean structure. The method further includes measuring total local magnetic fields at the first and second positions using the corresponding first and second magnetic field measurement devices, processing the total local magnetic fields at the first and second positions and a reference magnetic field to determine a portion of the total local magnetic fields attributable to the target subterranean structure, and generating interference magnetic field vectors at the first and second positions from the portion of the total local magnetic field attributable to the target subterranean structure. The method further includes processing the interference magnetic field vectors to determine tool face to target angles at each of the first and second positions. One variation of this aspect further includes providing a historical survey of at least a portion of the target subterranean structure and processing the tool face to target values at the first and second positions and the historical survey to determine a distance from the borehole to the target subterranean structure. Another variation of this aspect includes processing the distance and the historical survey to determine a location of either the first or second positions and utilizing the location to determine a borehole azimuth.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should be also be realize by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 is a schematic representation of an exemplary embodiment of a MWD tool according to the present invention including both upper and lower sensor sets.

FIGS. 3A and 3B are schematic representations of an exemplary application of this invention.

DETAILED DESCRIPTION

Figure 2:
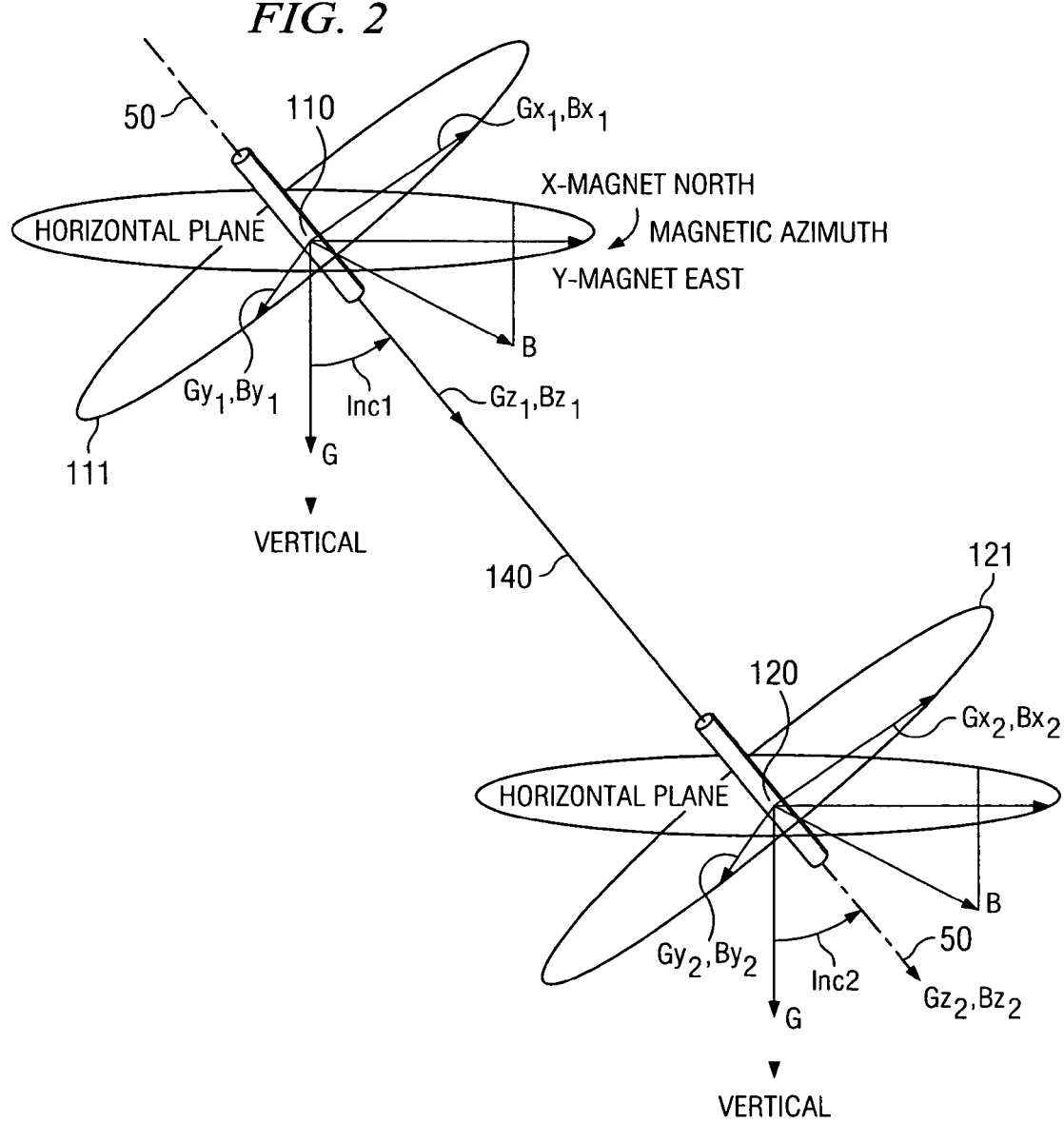
FIG. 2 is a diagrammatic representation of a portion of the MWD tool of FIG. 1 showing unit magnetic field and gravity vectors.

Referring now to FIG. 1, one exemplary embodiment of a downhole tool 100 useful in conjunction with the method of the present invention is illustrated. In FIG. 1, downhole tool 100 is illustrated as a measurement while drilling (MWD) tool including upper 110 and lower 120 sensor sets coupled to a bottom hole assembly (BHA) 150 including, for example, a steering tool 154 and a drill bit assembly 158. The upper 110 and lower 120 sensor sets are disposed at a known spacing, for example, on the order of from about 2 to about 20 meters (i.e., about 6 to about 60 feet). Each sensor set (110 and 120) includes at least two (and preferably three) mutually orthogonal magnetic field sensors, with at least one magnetic field sensor in each set having a known orientation with respect to the borehole, and three mutually orthogonal gravity sensors. It will be appreciated that the method of this invention may also be practiced with a downhole tool including only a single sensor set having at least two magnetic field sensors.

Referring now to FIG. 2, a diagrammatic representation of a portion of the MWD tool of FIG. 1 is illustrated. In the embodiment shown on FIGS. 1 and 2, each sensor set includes three mutually perpendicular magnetic field sensors, one of which is oriented substantially parallel with the borehole and measures magnetic field vectors denoted as Bz1 and Bz2 for the upper 110 and lower 120 sensor sets, respectively. The upper 110 and lower 120 sensor sets are linked by a structure 140 (e.g., a semi-rigid tube such as a portion of a drill string) that permits bending along its longitudinal axis 50, but substantially resists rotation between the upper 110 and lower 120 sensor sets along the longitudinal axis 50. Each set of magnetic field sensors thus may be considered as determining a plane (Bx and By) and pole (Bz) as shown. As described in more detail below, embodiments of this invention typically only require magnetic field measurements in the plane of the tool face (Bx and By as shown in FIG. 2 which corresponds with plane 121, for example, in sensor set 120). The structure 140 between the upper 110 and lower 120 sensor sets may advantageously be part of, for example, a MWD tool as shown above in FIG. 1. Alternatively, structure 140 may be a part of substantially any other logging and/or surveying apparatuses, such as a wireline surveying tool.

Figure 3B:
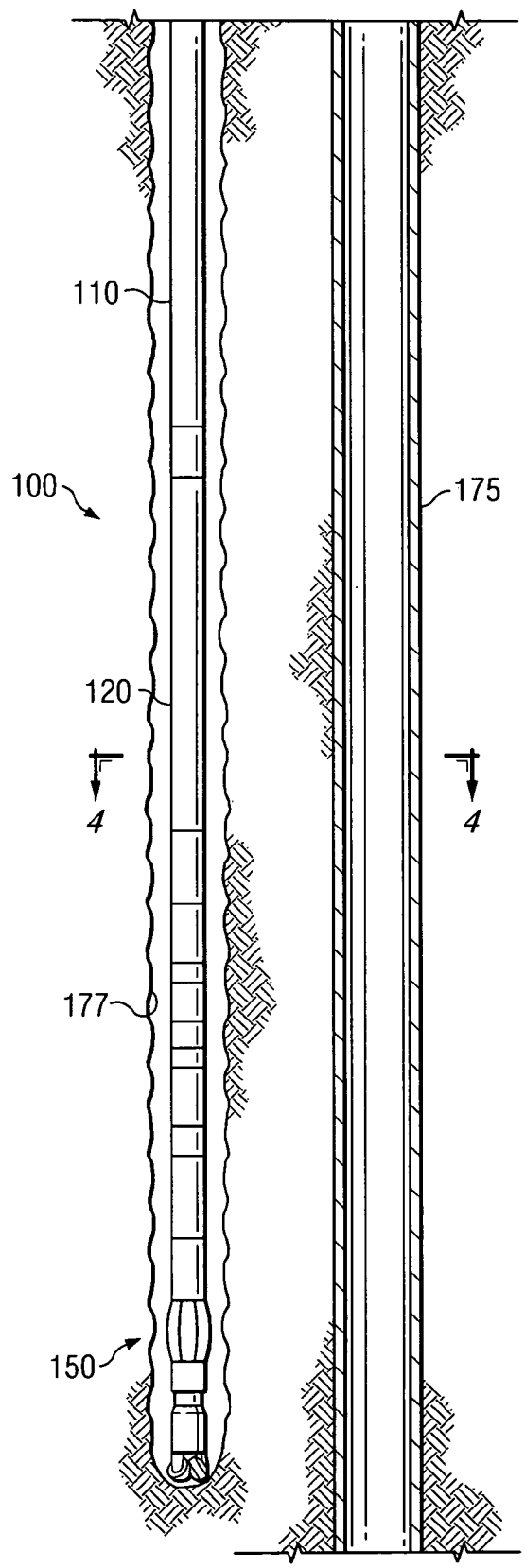

As described above, embodiments of this invention may be particularly useful, for example, in well twinning applications (e.g., relief well drilling), such as that shown in FIGS. 3A and 3B. Generally speaking twinning refers to applications in which one well is drilled in close proximity (e.g., parallel) to another well for various purposes. Relief well drilling generally refers to an operation in which one will is drilled to intercept another well (e.g., to prevent a blow). Nevertheless, the terms twinning and relief well will be used synonymously and interchangeably in this disclosure. In FIG. 3A, a bottom hole assembly 150 is kicked off out of a casing window 178 in a pre-existing borehole 175. "Kicking off" refers to a quick change in the angle of a borehole, and may be associated, for example with drilling a new hole from the bottom or the side of an existing borehole. A relief well 177, for example, is then drilled substantially parallel with the pre-existing borehole 175, as shown in FIG. 3B. In such applications there tends to be significant magnetic interference emanating from the pre existing borehole 175, e.g., from the well casing, owing, for example, to residual magnetization from magnetic particle inspection procedures. Normally, such magnetic interference fades (decreases) quickly as the distance to the pre-existing borehole increases. However, in relief well applications, for example, in which the distance between the relief well 177 and the pre-existing borehole 175 typically remains small (e.g., from about 1 to about 10 feet), such magnetic interference tends to significantly interfere with the determination of borehole azimuth using conventional magnetic surveying techniques. Further, such relief well drilling applications are often carried out in near horizontal wells (e.g., to divert around a portion of a pre-existing borehole that is blocked or has collapsed). Thus conventional gyroscope and gravity azimuth surveying methods may be less than optimal for borehole surveying in such applications. As described in more detail below, this invention looks to the magnetic interference from a target well (e.g., pre-existing borehole 175) to determine the azimuth of the measured well (e.g., relief well 177). Surveying according to the present invention may thus be useful in such relief well and/or well twinning applications. Other exemplary applications may include, but are not limited to, river crossings in which an existing well is followed around various obstacles, re-entry and/or well kill applications, well avoidance applications, and substantially any application in which multiple substantially parallel wells are desirable (such as also useful in mineral extraction and ground freeze applications).

It should be noted that the magnetic interference may emanate from substantially any point or points on the target well. It may also have substantially any field strength and be oriented at substantially any angle to the target well, with the field strength at a particular location generally decreasing with distance from the target borehole. Further, the magnetic interference tends to be caused by the tubular elements in the target well, e.g., the casing, drill string, collars, and the like. The magnetic interference surrounding these elements is determined by the magnetism (both induced and permanent) in the metal. The shape of the interference pattern is particularly influenced by the homogeneity of the magnetism and the shape of the metal element. Typically, the magnetism is substantially homogeneous and the shape rotationally symmetrical and tubular. Objects in a borehole, such as pipe sections and the like, are often threadably coupled to form a substantially continuous cylinder. Thus, the origin of any magnetic interference emanating from a borehole may generally be considered to originate in cylinders therefrom. The magnetic field emanating from such a borehole (target well) is typically caused by such cylinders in a manner typically displayed by cylindrical magnets. Such is the basis for the passive ranging techniques disclosed in the McElhinney patents.

The magnetic interference may be measured as a vector whose orientation depends on the location of the measurement point within the magnetic field. In order to determine the magnetic interference vector at any point downhole, the magnetic field of the earth must be subtracted from the measured magnetic field vector. The magnetic field of the earth (including both magnitude and direction components) is typically known, for example, from previous geological survey data. However, for some applications it may be advantageous to measure the magnetic field in real time on site at a location substantially free from magnetic interference, e.g., at the surface of the well or in a previously drilled well. Measurement of the magnetic field in real time is generally advantageous in that in that it accounts for time dependent variations in the earth's magnetic field, e.g., as caused by solar winds. However, at certain sites, such as on an offshore drilling rig, measurement of the earth's magnetic field in real time may not be possible. In such instances, it may be preferable to utilize previous geological survey data in combination with suitable interpolation and/or mathematical modeling (i.e., computer modeling) routines.

The earth's magnetic field at the tool may be expressed as follows:

$M_{EX} = H_E(\cos D \sin Az \cos R + \cos D \cos Az \cos Inc \sin R - \sin D \sin Inc \sin R)$ $M_{EY} = H_E(\cos D \cos Az \cos Inc \cos R + \sin D \sin Inc \cos R - \cos D \sin Az \sin R)$ $M_{EZ} = H_E(\sin D \cos Inc - \cos D \cos Az \sin Inc)$   Equation 1 where Mex, Mey, and Mez represent the x, y, and z components, respectively, of the earth's magnetic field as measured at the downhole tool, where the z component is aligned with the borehole axis, He is known (or measured as described above) and represents the magnitude of the earth's magnetic field, and D, which is also known (or measured), represents the local magnetic dip. Inc, Az, and R, represent the Inclination, Azimuth and Rotation (also known as the gravity tool face), respectively, of the tool, which may be obtained, for example, from conventional gravity surveying techniques. However, as described above, in various relief well applications, such as in near horizontal wells, azimuth determination from conventional surveying techniques tends to be unreliable. In such applications, since the measured borehole and the target borehole are essentially parallel (i.e., within a five or ten degrees of being parallel), Az values from the target well, as determined, for example in a historical survey, may be utilized.

The magnetic interference vectors may then be represented as follows:

$$M_{IX} = B_X - M_{EX}$$
$$M_{IY} = B_Y - M_{EY}$$
$$M_{IZ} = B_Z - M_{EZ}$$

Equation 2 where Mix, Miy, and Miz represent the x, y, and z components, respectively, of the magnetic interference vector and Bx, By, and Bz, as described above, represent the measured magnetic field vectors in the x, y, and z directions, respectively.

The artisan of ordinary skill will readily recognize that in determining the magnetic interference vectors it may also be necessary to subtract other magnetic field components, such as drill string and/or motor interference from the borehole being drilled, from the measured magnetic field vectors. Techniques for accounting for such other magnetic field components are well known in the art.

Figure 4:
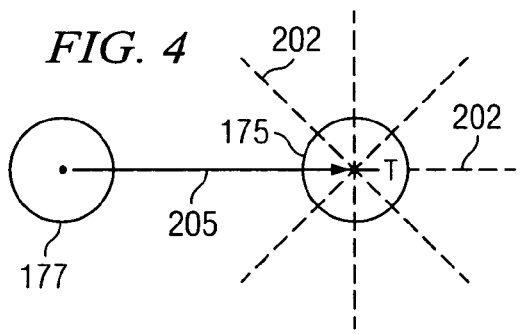
FIG. 4 is a schematic representation of a cross sectional view along section 4—4 of FIG. 3B.

Referring now to FIGS. 4 through 13, embodiments of the method of this invention are described in further detail. With reference to FIG. 4, a cross section as shown on FIG. 3B is depicted looking down the target borehole 175. Since the measured borehole and the target borehole are approximately parallel, the view of FIG. 4 is also essentially looking down the measured borehole. The magnetic flux lines 202 emanating from the target borehole 175 are shown to substantially intersect the target borehole 175 at a point T. Thus a magnetic field vector 205 determined at the measured borehole 177, for example, as determined by Equations 1 and 2 above, provides a direction from the measured borehole to the target borehole 175. Since the measured borehole and the target borehole are typically essentially parallel, determination of a two-dimensional magnetic field vector (e.g., in the planes of the tool faces 111 and 121 shown in FIG. 2) and a two-dimensional interference vector is advantageously sufficient for determining the direction from the measured well to the target well. Two-dimensional magnetic field and interference vectors may be determined according to Equations 1 and 2 by solving for Mex, Mey, Mix, and Miy. As such measurement of the magnetic field in two dimensions (e.g., Bx and By) may likewise be sufficient for determining the direction from the measured well to the target well. Nevertheless, for certain applications it may be preferable to measure the magnetic field in three dimensions.

A tool face to target (TFT) value (also referred to herein as a tool face to target angle) may be determined from the magnetic interference vectors given in Equation 2 as follows:

$$TFT = \arctan\left(\frac{M_{IX}}{M_{IY}}\right) + \arctan\left(\frac{G_x}{G_y}\right) \quad \text{Equation 3}$$

where TFT represents a tool face to target direction (angular orientation), Mix and Miy represent the x and y components, respectively, of the magnetic interference vector, and Gx and Gy represent x and y components of the measured gravitational field (e.g., gravity vectors measured at at least one of the first and second sensor sets 110, 120 in FIG. 2). As shown in FIG. 4, the TFT indicates the direction from the measured well 177 to the target well 175. For example, a TFT of 90 degrees, as shown in FIG. 4, indicates that the target well 175 is directly to the right of the measured well 177. A TFT of 270 degrees, on the other hand, indicates that the target well is directly to the left of the measured well. Further, at TFT values of 0 and 180 degrees the target well 175 is directly above and directly below, respectively, the measured well 177. It will be appreciated that in certain applications, Equation 3 does not fully define the direction from the measured well 177 to the target well 175. Thus in such applications, prior knowledge regarding the general direction from the measured well to the target well (e.g., upwards, downwards, left, or right) may be utilized in combination with the TFT values determined in Equation 3. Alternatively, changes in the TFT values between adjacent survey points may be utilized to provide further indication of the direction from the measured well 177 to the target well 175.

In certain applications, determination of the TFT at two or more points along the measured well bore may be sufficient to guide continued drilling of the measured well, for example, in a direction substantially parallel with the target well. This is shown schematically in FIG. 5, which plots 250 TFT 252 versus Well Depth 254. Data sets 262, 264, 266, and 268 represent TFT values determined at various well depths. Each data set, e.g., data set 262, includes two data points, A and B, determined at a single survey location (station). In data set 262, for example, data point A is the TFT value determined from the magnetic interference vector measured at an upper sensor set (e.g., sensor set 110 in FIGS. 1 through 3B) and data point B is the TFT value determined from the magnetic interference vector measured at a lower sensor set (e.g., sensor set 120 in FIGS. 1 through 3B), which resides some fixed distance (e.g., from about 6 to about 60 feet) further down the borehole than the upper sensor set. Thus at each survey station (data sets 262, 264, 266, and 268) two magnetic interference vectors may be determined. The TFT at each data point indicates the direction to the target borehole from that point on the measured borehole. Additionally, and advantageously for MWD embodiments including two sensor sets, comparison of the A and B data points at a given survey station (e.g., set 262) indicates the relative direction of drilling with respect to the target well at the location of that survey station. Further, since a drill bit is typically a known distance below the lower sensor set, the TFT at the drill bit may be determined by extrapolating the TFT values from the upper and lower sensor sets (points A and B on FIG. 5).

Figure 5:
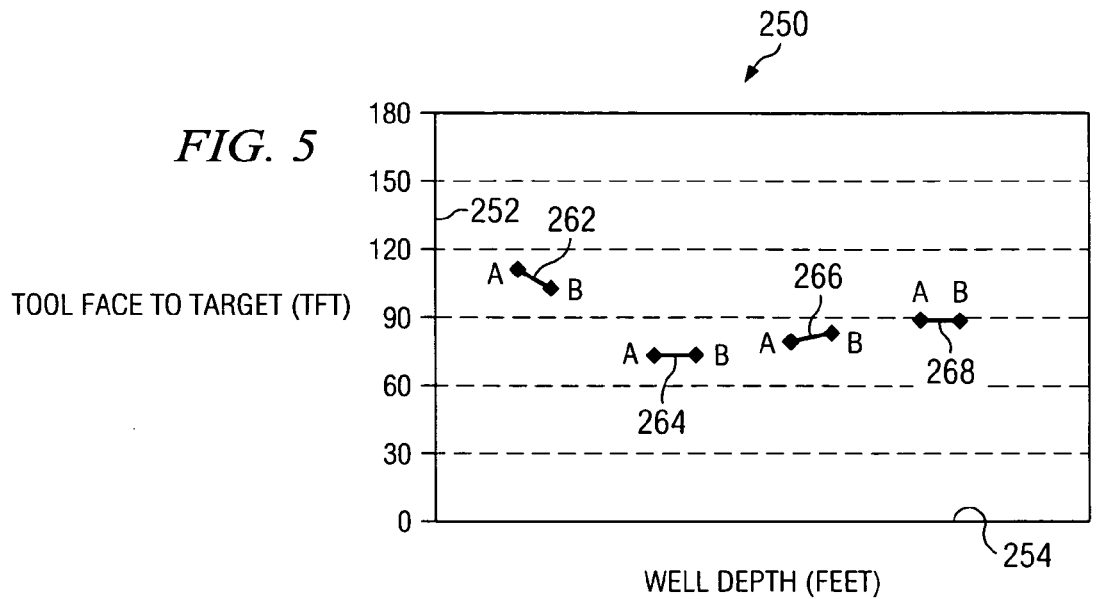
FIG. 5 is a schematic representation of a hypothetical plot of tool face to target versus well depth as an illustrative example of one embodiment of this invention.

With continued reference to FIG. 5, data sets 262, 264, 266, and 268 are described in more detail. In this hypothetical example, data sets 262, 264, 266, and 268 represent sequential survey stations (locations) during an MWD drilling operation and thus may be spaced at a known interval (e.g., about 50 feet) in the measured well. At data set 262, the target well is down and to the right of the measured well as indicated by the TFT values. Since the TFT at point B is closer to 90 degrees than that of point A, data set 262 indicates that the measured well is pointing downward relative to the target well. For a drilling operation in which it is intended to drill the measured well parallel and at the same vertical depth as the target well (e.g., at a TFT of 90 degrees), data set 262 would indicate that drilling should continue for a time in approximately the same direction. At data set 264, the measured well has moved below the target well as indicated by TFT values below 90 degrees. Similar TFT values for points A and B indicate that the measured MWD tool (and therefore the measured well) is pointed horizontally relative to the target well. At data set 266, the measured well remains below the target well, but is pointing upward relative thereto. And at data set 268, the measured well is at about the same vertical depth as the target well and substantially aligned therewith vertically.

While tool face to target values determined from the magnetic interference vectors provide potentially valuable directional information relating to the position of a measured well relative to a target well, they do not, alone, provide an indication of the distance from the measured well to the target well. According to one aspect of this invention, the TFT values may be utilized, along with survey data from the measured well (e.g., inclination values) and historical survey data from the target well, to determine a distance from the measured well to the target well. In one variation of this aspect, the direction and distance from the measured well to the target well may then be utilized to determine absolute coordinates and azimuth values for the measured well at various points along the length thereof.

Figure 6:
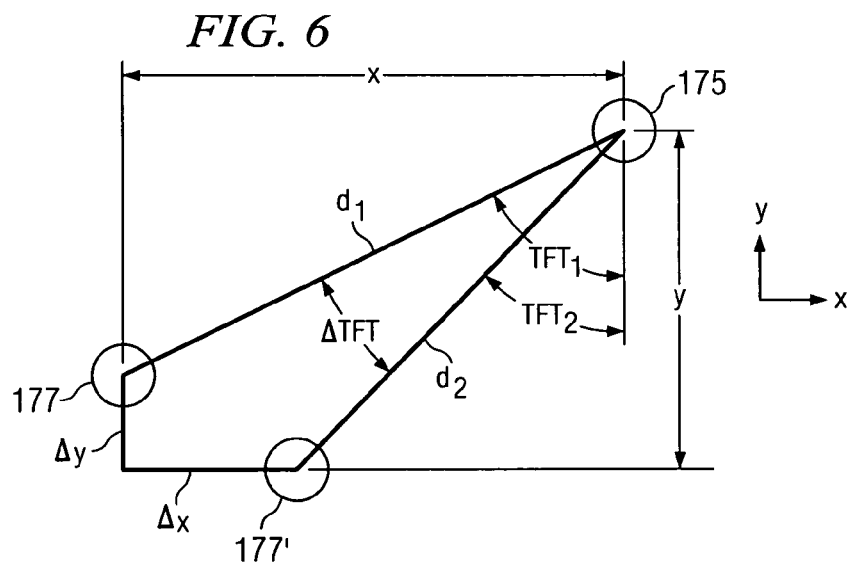
FIG. 6 depicts a cross sectional view similar to that of FIG. 4 as an illustrative example of various embodiments of this invention.

With reference now to FIG. 6, a view down the target borehole, similar to that of FIG. 4, is shown. It will be appreciated that for near horizontal wells, the x and y directions in FIG. 6 correspond essentially to horizontal and vertical directions relative to the target well 175. At first and second survey points 177, 177' (e.g., as measured at sensor sets 110 and 120, respectively, as shown in FIGS. 1 through 3B) the measured borehole is generally downward and to the left of target borehole 175, as shown. As described above, this is indicated by the TFT values TFT1, TFT2 at the two survey points being less than 90 degrees. In the general case illustrated in FIG. 6, the measured well 177, 177' is not precisely parallel with the target well 175. As such, the relative position of the measured well with respect to the target well 175 (in the view of FIG. 6) is a function of the measured depth of the measured well (as shown by the relative change in position between the two wells at the first and second survey points 177, 177'). Such a change in the relative position at the first and second survey points 177, 177' is represented by Δx and Δy in FIG. 6, where Δx represents the relative change in horizontal position between the first and second survey points 177, 177' of the measured well and corresponding points on the target well 175 (e.g., substantially orthogonal to the longitudinal axis of the measured well at the first and second survey points), and Δy represents the relative change in vertical position between the first and second survey points 177, 177' of the measured well and corresponding points on the target well 175. As described above, in many instances the relative change in positions between the two wells (as defined by $\Delta x$ and $\Delta y$) results in a change in the measured tool face to target value, $\Delta TFT$, between the first and second survey points 177, 177'. As described in greater detail below, for certain applications, the distances d1 and d2 from the first and second survey points 177, 177' on the measured well to the target well 175 are approximately inversely proportional to $\Delta TFT$.

It will be appreciated that based on FIG. 6 and known trigonometric principles, the distances d1 and d2 may be determined mathematically, for example, from $\Delta x$, $\Delta y$, TFT1 and TFT2. With continued reference to FIG. 6, and according to the Pythagorean Theorem, distances d1 and d2 may be expressed mathematically as follows:

$$d1 = \sqrt{x^2 + (y - \Delta y)^2} \qquad \text{Equation 4}$$
$$d2 = \sqrt{(x - \Delta x)^2 + y^2}$$

where x and y represent the horizontal distance from the first survey point 177 to the target well 175 and the vertical distance from the second survey point 177' to the target well 175, respectively. x and y may be expressed mathematically as follows:

$$x = \frac{-\Delta x \, \tan(TFT1) - \Delta y \, \tan(TFT1)\tan(TFT2)}{\tan(TFT2) - \tan(TFT1)} \qquad \text{Equation 5}$$
$$y = \frac{-\Delta y \, \tan(TFT1) - \Delta x}{\tan(TFT2) - \tan(TFT1)}$$

where, as described above, $\Delta x$ represents the relative change in horizontal position between the first and second survey points 177, 177' of the measured well and corresponding points on the target well 175, $\Delta y$ represents the relative change in the vertical position between the first and second survey points 177, 177' on the measured well and corresponding points on the target well 175, and TFT1 and TFT2 represent the tool face to target values at the first and second survey points 177, 177', respectively. As described in greater detail below, $\Delta x$ and $\Delta y$ may be determined, for example, from azimuth and inclination measurements of the measured and target wells.

Distances d1 and d2 may alternatively be expressed mathematically as follows:

$$d1 = \frac{-\Delta x - \Delta y \, \tan(TFT2)}{\cos(TFT1)[\tan(TFT2) - \tan(TFT1)]} \qquad \text{Equation 6}$$
$$d2 = \frac{-\Delta x - \Delta y \, \tan(TFT1)}{\cos(TFT2)[\tan(TFT2) - \tan(TFT1)]}$$

where d1, d2, $\Delta x$, TFT1, and TFT2 are defined above.

As shown below in more detail, $\Delta x$ and $\Delta y$ may be determined from azimuth and inclination values, respectively, of the measured and target wells. For some drilling applications in which embodiments of this invention are suitable, magnetic interference tends to interfere with the determination of azimuth values of the measured well using conventional magnetic surveying techniques. In such applications determination of $\Delta x$ may be problematic. Thus, in certain applications, it may be advantageous to determine the distances d1 and d2 independent from $\Delta x$ (and therefore independent of the azimuth values of the measured and target wells).

In various applications, such as common well twinning and relief well drilling applications, the intent of the drilling operation is to position the measured well substantially parallel and side by side with the target well 175. As described above, the measured TFT values for such applications are approximately 90 or 270 degrees (e.g., within about 45 degrees thereof). It will be appreciated that in such applications relative changes in the horizontal position between the measured and target wells, $\Delta x$, typically has a minimal effect on the measured TFT values (i.e., results in a relatively small $\Delta TFT$ value for a given $\Delta x$). As such, for many applications, determination of the distances d1 and d2 from survey points 177, 177' of the measured well to corresponding points on the target well 175 may be derived considering only relative changes in the vertical position, $\Delta y$, between the measured and target wells.

Figure 7A:
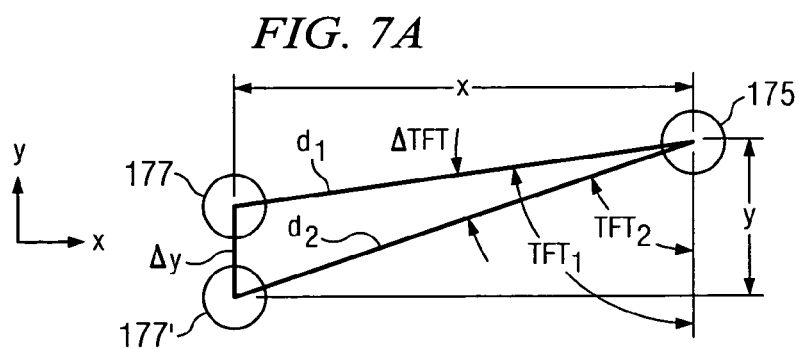
FIGS. 7A and 7B depict cross sectional views similar to those of FIGS. 4 and 6 as illustrative examples of other embodiments of this invention.

With reference now to FIG. 7A, distances d1 and d2 may be expressed mathematically with respect to $\Delta y$, TFT1, and TFT2 as follows:

$$d1 = \frac{-\Delta y \, \tan(TFT2)}{\cos(TFT1)[\tan(TFT2) - \tan(TFT1)]} \qquad \text{Equation 7}$$
$$d2 = \frac{-\Delta y \, \tan(TFT1)}{\cos(TFT2)[\tan(TFT2) - \tan(TFT1)]}$$

where, as described above, d1 and d2 represent the distances from the measured well to the target well at the first and second survey points 177, 177', respectively, TFT1 and TFT2 represent the tool face to target values at the first and second survey points 177, 177', respectively, and $\Delta y$ represents the relative change in vertical position between the first and second survey points 177, 177' of the measured well and corresponding points on the target well.

Figure 7B:
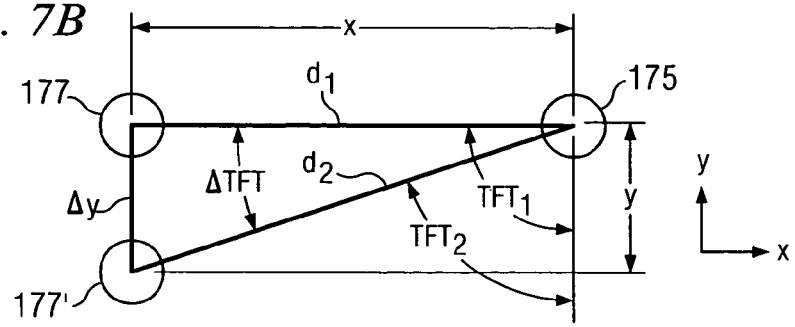

Turning now to FIG. 7B, for certain applications (e.g., when a measured well is drilled substantially side by side with a target well), the tool face to target value may be assumed to be approximately equal to 90 or 270 degrees. Based on such an assumption, the distances d1 and d2 may alternatively be expressed mathematically as follows:

$$d1 = \frac{\Delta y}{\tan(\Delta TFT)} \qquad \text{Equaition 8}$$
$$d2 = \frac{\Delta y}{\sin(\Delta TFT)}$$

where, as stated above, $\Delta TFT$ is the difference between the tool face to target values at the first and second survey points 177, 177'. At relatively small $\Delta TFT$ values (e.g., when $\Delta TFT$ is less than about 30 degrees), the distances d1 and d2 may alternatively be expressed mathematically as follows:

$$d1 \approx d2 \approx \frac{\Delta y}{\Delta TFT} \qquad \text{Equation 9}$$

where $\Delta TFT$ is in units of radians.

Equation 9 advantageously describes distance (d1 and d2) from the measured well to the target well 175 as being substantially proportional to Δy and as substantially inversely proportional to the change in tool face to target value ΔTFT. While not generally applicable to all well drilling applications (or even to all twinning applications), Equation 9 may be valuable for many applications in that it provides relatively simple operational guidance regarding the distance from the measured well to the target well. For example, in certain applications, if the change in tool face to target value ΔTFT between two survey points is relatively small (e.g., less than about 5 degrees or 0.1 radians) then the distance to the target well is at least an order of magnitude greater than Δy (e.g., d1 and d2 are about a factor of 10 greater than Δy when ΔTFT is about 5 degrees or 0.1 radians). Conversely, if ΔTFT is relatively large (e.g., about 30 degrees or 0.5 radians) then the distance to the target well is only marginally greater than Δy (e.g., d1 and d2 are about a factor of 2 greater than Δy when ΔTFT is about 30 degrees or 0.5 radians).

With continued reference to FIGS. 7A and 7B, and Equations 7 through 9, it can be seen that the distances from the first and second survey points 177, 177' of the measured well to corresponding points on the target well are expressed mathematically as functions of Δy, TFT1 and TFT2. As described above, TFT1 and TFT2 may be determined from magnetic interference emanating from the target well. Δy may typically be determined from conventional survey data obtained for the measured well and/or from historical survey data for the target well. In one exemplary embodiment of this invention, Δy may be determined from inclination values at the first and second survey points 177, 177' of the measured well and corresponding points on the target well. The inclination values for the measured well may be determined via substantially any known method, such as, for example, via local gravity measurements, as described in more detail below and in the McElhinney patents. The inclination values of the target well are typically known from a historical survey obtained, for example, via gyroscope or other conventional surveying methodologies in combination with known interpolation techniques as required. Such inclination values may be utilized in conjunction with substantially any known approach, such as minimum curvature, radius of curvature, average angle, and balanced tangential techniques, to determine the relative change in vertical position between the two wells, Δy. Using one such technique, Δy may be expressed mathematically as follows:

$$\Delta y = \Delta MD \left( \sin\left( \frac{IncM1 + IncM2}{2} - \frac{IncT1 + IncT2}{2} \right) \right) \quad \text{Equation 10}$$

where ΔMD represents the change in measured depth between the first and second survey points, IncM1 and IncM2 represent inclination values for the measured well at the first and second survey points 177, 177', and IncT1 and IncT2 represent inclination values for the target well at corresponding first and second points.

As described above, for many drilling applications in which embodiments of this invention are suitable, magnetic interference from the target well tends to significantly interfere with the determination of the azimuth of the measured well using conventional magnetic surveying techniques. Further, such drilling applications are often carried out in near horizontal wells (e.g., to divert around a portion of a pre-existing borehole that has collapsed). Thus conventional gyroscope and gravity azimuth surveying methods may be less than optimal for borehole surveying in such applications. As shown above, in Equations 7 through 10, the distances d1 and d2 from the measured well to the target well may be determined from TFT1, TFT2, and the inclination values at corresponding points along the measured and target wells. It will be appreciated that Equations 7 through 10 are advantageously independent of the azimuth values of either the measured or target wells. Thus a determination of the azimuth values (or the relative change in azimuth values) is not necessary in the determination of distances d1 and d2. Further, as described in more detail below, the distances d1 and d2, along with a historical survey of the target well, may be utilized to determine the coordinates of the first and second survey points 177, 177' and the local azimuth of the measured well.

It will be appreciated that according to Equations 4 through 9, determination of the distances d1 and d2 requires a relative change in the position of the measured well with respect to the target well (e.g., Δx and/or Δy) that results in a measurable change in the tool face to target angle (ΔTFT) between the first and second survey points 177, 177'. For certain applications in which the measured well closely parallels the target well it may be desirable to occasionally deviate the path of the measured well with respect to the target well in order to achieve significant changes in tool face to target angles (e.g., ΔTFT on the order of a few degrees or more). Such occasional deviation of the path of the measured well may advantageously improve the accuracy of a distance determination between the two wells. For example, in an application in which the measured well is essentially parallel with the target well at a tool face to target angle of about 90 degrees (i.e., the measured well lies to the right of the target well), it may be desirable to occasionally deviate the measured well path upwards and then back downwards with respect to the target well. Such upward and downward deviation of the measured well path may result in measurable Δy and ΔTFT values that may be advantageously utilized to calculate distance values as described above.

The artisan of ordinary skill will readily recognize that Equations 4 through 10 may be written in numerous equivalent or similar forms. For example, the definitions of TFT1 and TFT2 or the signs of Δx and Δy may be modified depending the quadrant in which survey points 177 and 177' reside. In addition, the origin in FIGS. 6 through 7B may be located at one of survey points 177 or 177' rather than at the target well 175. All such modifications will be understood to be within the scope of this invention.

With the determination of the direction (i.e., TFT or ΔTFT) and the distance, d1 or d2, from the measured borehole to the target borehole at various points along the measured borehole it is possible to determine the location (i.e., the absolute coordinates) of those points on the measured borehole based on historical survey data for the target well. The location at survey points 177 and 177' may be given as follows:

$$PMx1 = PTx - d1 \sin(TFT1) \quad \text{Equation 11}$$
$$PMy1 = PTy - d1 \cos(TFT1)$$
$$PMx2 = PTy - d2 \sin(TFT2)$$
$$PMy2 = PTy - d2 \cos(TFT2)$$

where PMx1 and PMy1, represent x and y coordinates at survey point 177, PMx2 and PMy2 represent x and y coordinates at survey point 177', PTx and PTy represent x and y coordinates of the target well 175, d1 and d2 represent distances from survey points 177, 177' to the target well 175, and TFT1 and TFT2 represent tool face to target values between the survey points 177 and 177' and the target well 175. It will be appreciated that the coordinates determined in Equation 11 are in a coordinate system looking down the longitudinal axis of the target well. The artisan of ordinary skill will readily be able to convert such coordinates into one or more conventional coordinate systems, including, for example, true north, magnetic north, UTM, and other custom coordinates systems.

Once the coordinates have been determined at the survey points 177 and 177' in a conventional coordinates system, determination of azimuth values for the measured borehole may be derived as follows:

$$AzM = \arctan\left(\frac{Cy2 - Cy1}{Cx2 - Cx1}\right) \quad \text{Equation 12}$$

where AzM represents a local azimuth between survey points 177 and 177' and Cx1, Cx2, Cy1, and Cy2 represent x and y coordinates in a conventional coordinates system at survey points 177 and 177', respectively. Inclination values may be determined, for example, from conventional surveying methodologies, such as via gravity sensor measurements (as described in more detail below).

Figure 8:
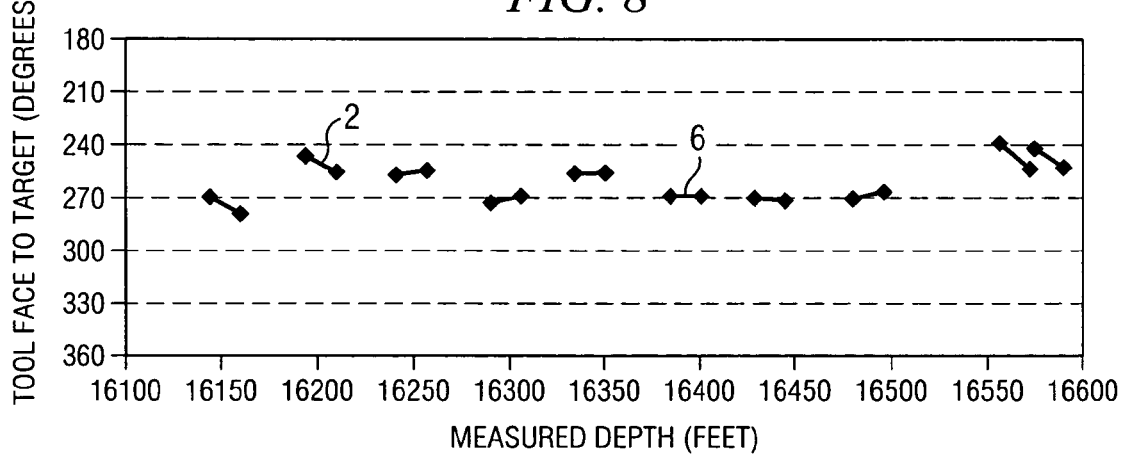
FIG. 8 is a graphical representation of tool face to target versus measured depth, similar to the hypothetical plot of FIG. 5, for a portion of an exemplary borehole survey conducted according to exemplary embodiments of this invention.
Figure 9:
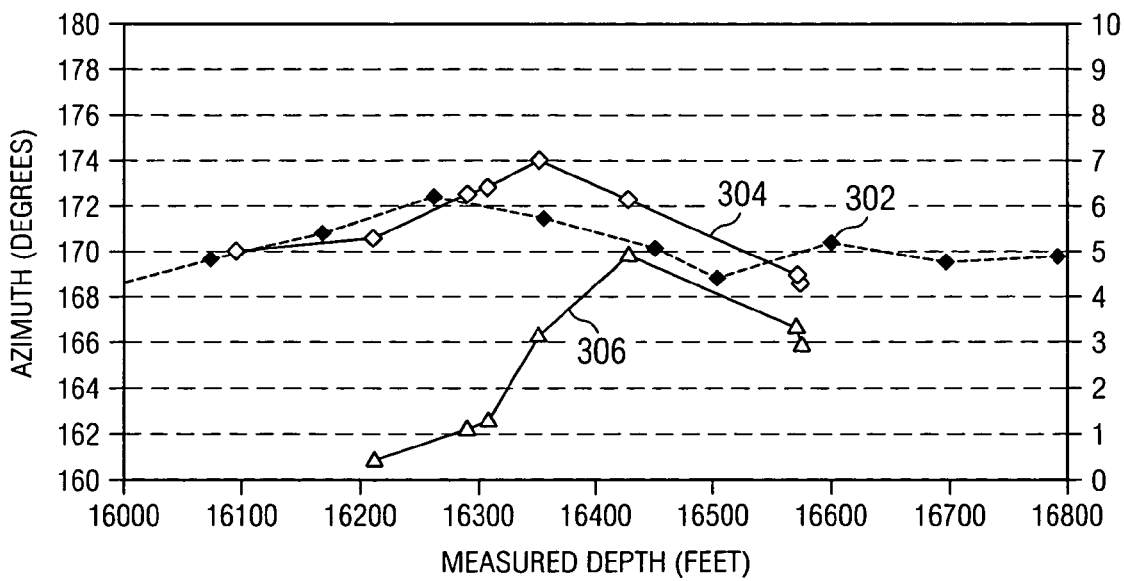
FIG. 9 is a graphical representation of azimuth and distance versus measured depth for another portion of the survey shown in FIG. 8.

Referring now to Table 1 and FIGS. 8 and 9, exemplary methods of the present invention are discussed further by way of an actual field test example. An MWD tool, similar to that described above with respect to FIG. 1, was used to guide drilling of a relief well essentially parallel with and at about the same vertical depth (i.e., essentially side by side) as an existing target well. The target well was essentially horizontal (having an inclination greater than 80 degrees) and oriented at an azimuth ranging from about 168 to about 173 degrees. With reference to Table 1, a portion of an exemplary survey conducted at a measured depth ranging from about 16,100 to about 16,600 feet is illustrated. At survey points 1 through 10, the gravity and magnetic fields were measured at upper and lower sensor sets. The upper sensor set was disposed about 16 feet above the lower sensor set and the survey points were spaced at about 50 foot intervals. Tool face to target (TFT) values were determined from the magnetic interference vectors at each survey point. The distances from the measured well to the target well were also measured at various survey points and were utilized to determine absolute coordinates and azimuth values at those points on the measured well as shown. Inclination values for the measured well were determined via conventional gravity vector measurements as in more detail below.

TABLE 1

| Survey | Sensor Set | Depth (ft) | TFT | Distance (ft) | Inclination | Azimuth |
|---|---|---|---|---|---|---|
| 1 | 1 | 16,144 | 269 | | 80.8 | |
|  | 2 | 16,160 | 279 | | 80.9 | |
|  | 1 | 16,194 | 246 | | 81.8 | |
| 2 | 2 | 16,210 | 255 | 0.6 | 82.4 | 171 |
|  | 1 | 16,241 | 256 | | 83.8 | |

TABLE 1-continued

| Survey | Sensor Set | Depth (ft) | TFT | Distance (ft) | Inclination | Azimuth |
|---|---|---|---|---|---|---|
| 3 | 2 | 16,257 | 254 | | 84.4 | |
|  | 1 | 16,290 | 273 | 1.1 | 84.5 | 172 |
| 4 | 2 | 16,306 | 268 | 1.4 | 85.2 | 172 |
|  | 1 | 16,335 | 256 | 3.0 | 86.7 | 174 |
| 5 | 2 | 16,351 | 255 | 3.2 | 87.2 | 172 |
|  | 1 | 16,385 | 269 | | 87.1 | |
| 6 | 2 | 16,401 | 269 | | 87.3 | |
|  | 1 | 16,429 | 270 | 5.0 | 87.7 | 172 |
| 7 | 2 | 16,445 | 271 | | 88.4 | |
|  | 1 | 16,480 | 270 | | 88.8 | |
| 8 | 2 | 16,496 | 266 | | 89.0 | |
|  | 1 | 16,556 | 238 | | 88.6 | |
| 9 | 2 | 16,572 | 253 | 3.5 | 88.9 | 168 |
|  | 1 | 16,574 | 242 | 3.0 | 88.6 | 168 |
| 10 | 2 | 16,590 | 253 | | 88.7 | |

Referring now to FIGS. 8 and 9, the data in Table 1 is discussed in more detail. FIG. 8 is a plot of tool face to target versus well depth. As described above, with respect to FIG. 5, the tool face to target data in FIG. 8 indicate the direction from the measured well to the target well at various points along the measured well. As also described above, the direction in which the measured well is pointing, relative to the target well, is indicated at each survey station. For example, at survey station 2, the measured well was positioned above the target well and pointing relatively downward. Likewise at survey station 6, the measured well was positioned approximately level with the target well and pointing substantially level therewith.

With reference now to FIG. 9 the azimuth values of the measured and target wells and the distance between those wells are plotted versus measured depth. The azimuth values for the target well are shown at 302 and were obtained from a historical survey of the target well. The azimuth values for the measured well are shown at 304. The distances between the measured and target wells are shown at 306. Table 1 above shows both the azimuth values for the measured well 304 and the distances 306 between the measured and target wells. These values were determined according to embodiments of this invention. At measured depths from about 16,100 to about 16,250 feet, the azimuth values for the measured and target wells were substantially the same, indicating that the measured well was closely paralleling the target well (as is desirable for various relief well applications). The relatively small distance between the two wells (about a foot) further confirms that the measured well was closely paralleling the target well. At a measured depth from about 16,300 to about 16,350 feet the azimuth of the measured well increased to about three degrees greater than that of the target well (about 174 versus about 171 degrees), indicating that the measured well was drifting slightly out of parallel with the target well. This is confirmed by the increased distance between the two wells (up to about five feet at a depth of 16,400 feet). The azimuth of the measured well was then corrected, based on the data from this survey, and the distance between the two wells reduced to about three feet (at a depth of about 16,600 feet).

Based on the data shown in this example in Table 1 and FIGS. 8 and 9 it can be seen that embodiments of this invention include a method for drilling a relief well (or a method for twinning a well) that includes utilizing the surveying techniques described herein to guide the drill string (the measured well) along a predetermined course substantially parallel with a target well. For example, as described above, an operator may utilize plots of tool face to target values versus well depth to adjust the vertical component of the drilling direction. Likewise a comparison of the azimuth values for the measured and target wells may be utilized to adjust the azimuthal (lateral) component of the drilling direction. Such a procedure enables the position of a measured well to be determined relative to the target well in substantially real time, thereby enabling the drilling direction to be adjusted to more closely parallel the target well.

In determining the magnetic interference vectors, tool face to target values, the distance between the measured and target wells, and the azimuth of the measured well, it may be advantageous in certain applications to employ one or more techniques to minimize or eliminate the effect of erroneous data. Several options are available. For example, it may be advantageous to apply statistical methods to eliminate outlying points, for example, removing points that are greater than some predetermined deviation away from a previously measured point. Thus for example, if the distance between two wells is 3 feet at a first survey point, a distance of 23 feet may be rejected at a second survey point. In certain instances it may also be desirable to remove individual interference vectors from the above analysis. For example, an interference vector may be removed when the magnitude of the interference magnetic field vector is less than some minimum threshold (e.g., 0.001 Gauss).

An alternative, and also optional, technique for minimizing error and reducing the effect of erroneous data is to make multiple magnetic field measurements at each survey station. For example, magnetic field measurements may be made at multiple tool face settings (e.g., at 0, 90, 180, and 270 degrees) at each survey station in the measured well bore. Such rotation of the tool face, while effecting the individual magnetometer readings (i.e., Bx and By), does not effect the interference magnetic field, the tool face to target, the distance between the two wells, or the azimuth of the measured well.

Figure 10:
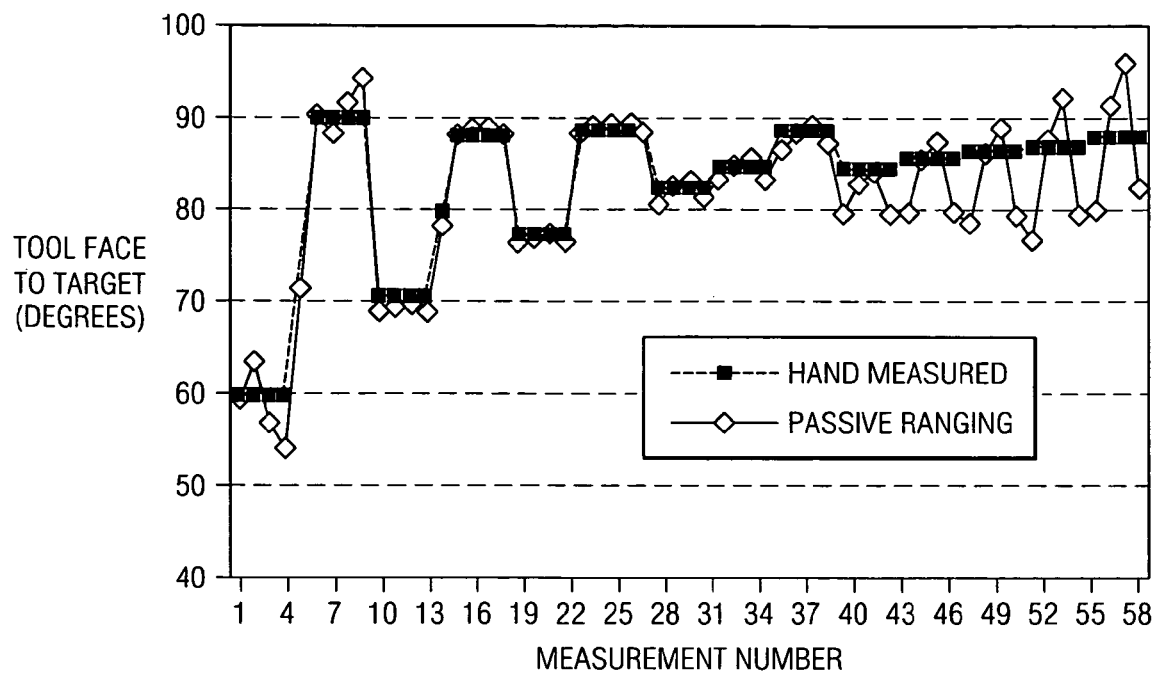
FIG. 10 is a graphical representation of tool face to target versus measurement number for a portion of a field test conducted according to exemplary embodiments of this invention.

Referring now to FIG. 10, a plot of tool face to target versus measurement number is shown for a field test in which a section of magnetized casing was placed substantially horizontally on the ground as a hypothetical target well. A hypothetical measured well was disposed nearby at a known position and orientation relative to the casing. A single set of magnetometers was utilized to measure the magnetic field at points (stations) along the hypothetical measured well. Magnetic interference vectors and tool face to target values were determined at each point as described above. At numerous points, the set of magnetometers was rotated to four distinct orientations (0, 90, 180, and 270 degrees) as described above. The tool face to target values determined via embodiments of this invention were compared to hand measured values. FIG. 10 shows excellent agreement between the tool face to target values determined via embodiments of the passive ranging techniques of this invention and the hand measured values.

FIG. 10 further shows, in this particular example, that at intermediate distances (e.g., from about 2 to about 20 feet shown in measurement points 10 through 50), highly accurate tool face to target values may be obtained from a measurement of the magnetic field at a single tool face setting. At very small distances (less than about 1 or 2 feet shown in measurement points 1 through 9) or large distances (greater than about 20 feet shown in measurement points 50 through 60), data averaging via rotation of the tool face, while not necessary, may improve tool face to target accuracy. Such improved accuracy may be advantageous for certain applications in which the position of a relief well must be known with a relatively high degree of accuracy.

Figure 11:
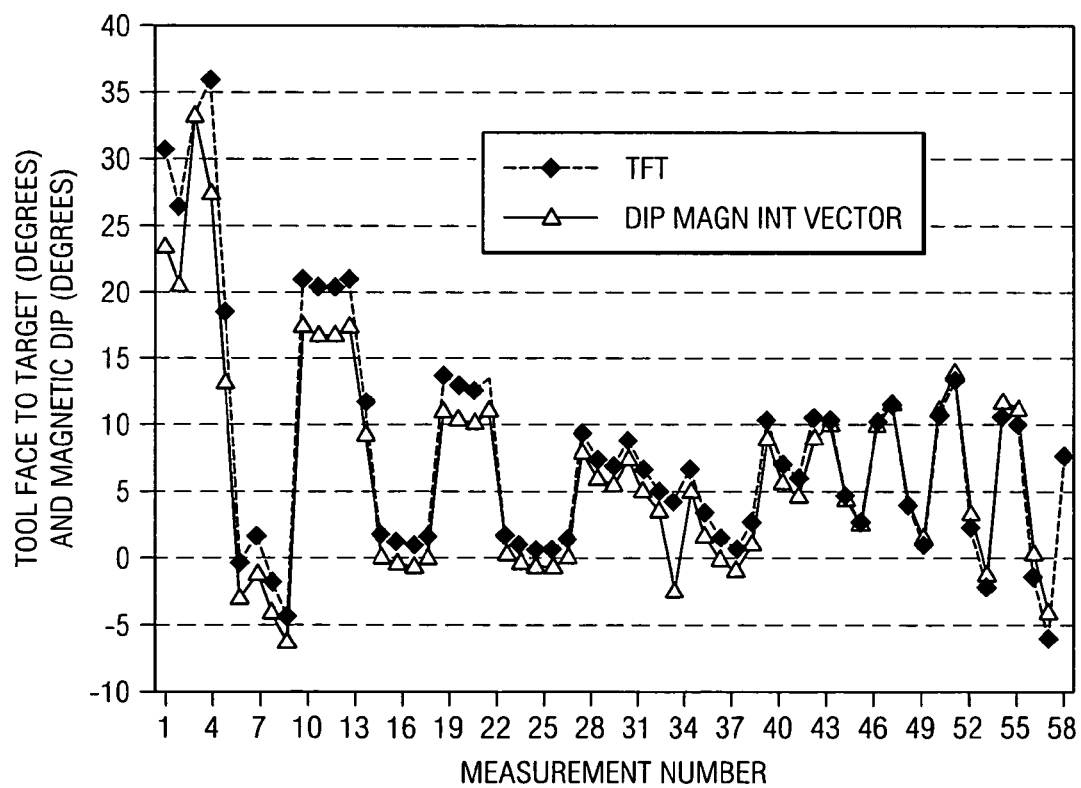
FIG. 11 is a graphical representation of tool face to target and the dip of the magnetic interference vector versus measurement number for the field test shown in FIG. 10.

Erroneous data may also optionally be identified by comparing the dip of the magnetic interference vectors with the tool face to target (TFT) values as shown in FIG. 11. The dip of the magnetic interference vector is theoretically less than or about equal to the TFT. Thus, survey points at which the dip of the magnetic interference vector is greater than the TFT may possibly be erroneous. FIG. 11 plots TFT and the dip of the magnetic interference vector versus the measurement number for the field test data shown in FIG. 10. As shown, the dip values are less than the TFT values except for a few measurement points (a portion of measurement points 50 through 60) at which the distance between the hypothetical measured and target wells is large (greater than about 20 feet) and the corresponding magnetic interference vector is weak (less than 0.02 Gauss). Such a large distance and weak magnetic interference field may, in some instances, introduce error into the TFT values.

With reference again to FIG. 6 and Equations 4 and 5, it was shown above that the distances d1 and d2 between the first and second survey points 177, 177' on the measured well and corresponding points on the target well 175 may be expressed mathematically as a function of the tool face to target values TFT1 and TFT2 and the relative changes in the horizontal $\Delta x$ and vertical $\Delta y$ positions between the first and second survey points 177, 177' on the measured well and corresponding points on the target well 175. With reference again to FIGS. 7A and 7B and Equations 6 through 8, it was shown that for certain applications in which TFT1 and TFT2 are about 90 or 270 degrees (e.g., within about 45 degrees thereof) distances d1 and d2 may alternatively be expressed mathematically as a function of $\Delta y$, TFT1, and TFT2 (i.e., substantially independent of $\Delta x$). As described above, such an alternative approach advantageously enables d1 and d2 to be determined based on the measured TFT values (TFT1 and TFT2) and inclination values for the measured and target wells (i.e., independent of azimuth values which are sometimes unreliable in regions of magnetic interference). However, it should be noted that this alternative approach is not necessarily suitable for all drilling applications. Rather, for some applications determination of the distances d1 and d2 may require knowledge of $\Delta x$ as described in Equations 4 and 5 and shown in FIG. 6.

As described above, both $\Delta x$ and $\Delta y$ may be determined from conventional survey data obtained for the measured well and historical survey data for the target well. While $\Delta y$ may be determined from inclination values, as shown in Equation 10, $\Delta x$ may be determined from azimuth values at the first and second survey points 177, 177' of the measured well and corresponding points on the target well. The azimuth values for the measured well may be determined via substantially any known method, such as, for example, via gravity MWD measurements, as described in more detail below and in the McElhinney patents. Azimuth values of the target well are typically known from a historical survey obtained, for example, via gyroscope or other conventional surveying methodologies in combination with known interpolation techniques as required. Such azimuth values may be utilized in conjunction with substantially any known approach, such as minimum curvature, radius of curvature, average angle, and balanced tangential techniques, to determine the relative change in horizontal position between the two wells, Δx. Using one such technique, Δx may be expressed mathematically as follows:

$$\Delta x = \Delta MD \left( \sin\left( \frac{AziM1 + AziM2}{2} - \frac{AziT1 + AziT2}{2} \right) \right) \quad \text{Equation 13}$$

where ΔMD represents the change in measured depth between the first and second survey points, AziM1 and AziM2 represent azimuth values for the measured well at the first and second survey points 177, 177', and AziT1 and AziT2 represent azimuth values for the target well at corresponding first and second points.

In certain of the above applications, the intent of the drilling operation may be to position the measured well substantially above or below the target well 175 (FIG. 6) or to pass over or under the target well 175. As described above, the measured TFT values for such applications are approximately 0 or 180 degrees (e.g., within about 45 degrees thereof). It will be appreciated that in such applications relative changes in the vertical position, Δy, between the measured and target wells typically has a minimal effect on the measured TFT values (i.e., results in a relatively small ΔTFT value for a given Δy). As such, for these applications, determination of the distances d1 and d2 from survey points 177, 177' of the measured well to corresponding points on the target well 175 may be derived considering only relative changes in the horizontal position, Δx, between the measured and target wells.

Figure 12:
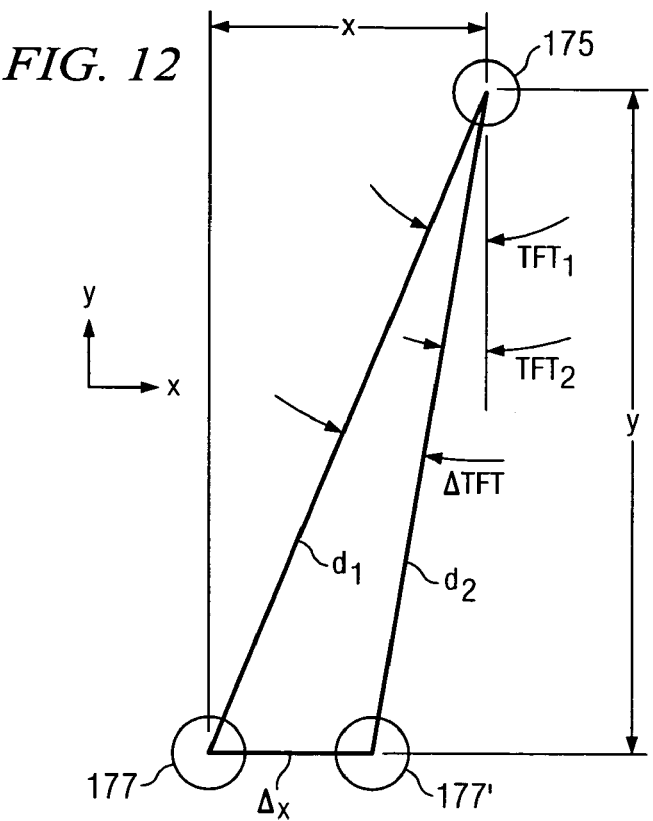
FIG. 12 depicts a cross sectional view similar to that of FIGS. 4, 6, 7A and 7B as an illustrative example of still other exemplary embodiments of this invention.

With reference now to FIG. 12, distances d1 and d2 may be expressed mathematically with respect to Δx, TFT1, and TFT2 as follows:

$$d1 = \frac{-\Delta x}{\cos(TFT1)[\tan(TFT2) - \tan(TFT1)]} \quad \text{Equation 14}$$

$$d2 = \frac{-\Delta x}{\cos(TFT2)[\tan(TFT2) - \tan(TFT1)]}$$

As described above with respect to Equations 6 through 8, Equation 14 may be expressed alternatively for applications in which the measured well is substantially parallel with and above or below the target well 175. In such instances, d1 and d2 may be approximated as follows:

$$d1 \approx d2 \approx \frac{\Delta x}{\Delta TFT} \quad \text{Equation 15}$$

where, as described above, Δx represents the relative change in horizontal position between first and second survey points 177, 177' of the measured well and corresponding points on the target well 175 and ΔTFT represents the change in TFT value between the first and second survey points 177, 177'. Similar to Equation 9, described above, Equation 15 advantageously describes the distance (d1 and d2) from the measured well to the target well 175 as being substantially proportional to Δx and as substantially inversely proportional to the change in tool face to target value ΔTFT. While, not generally applicable to all well drilling applications (or even to all twinning applications), Equation 15 may be valuable for certain exemplary applications in that it provides relatively simple operational guidance regarding the distance from the measured well to the target well.

Figure 13:
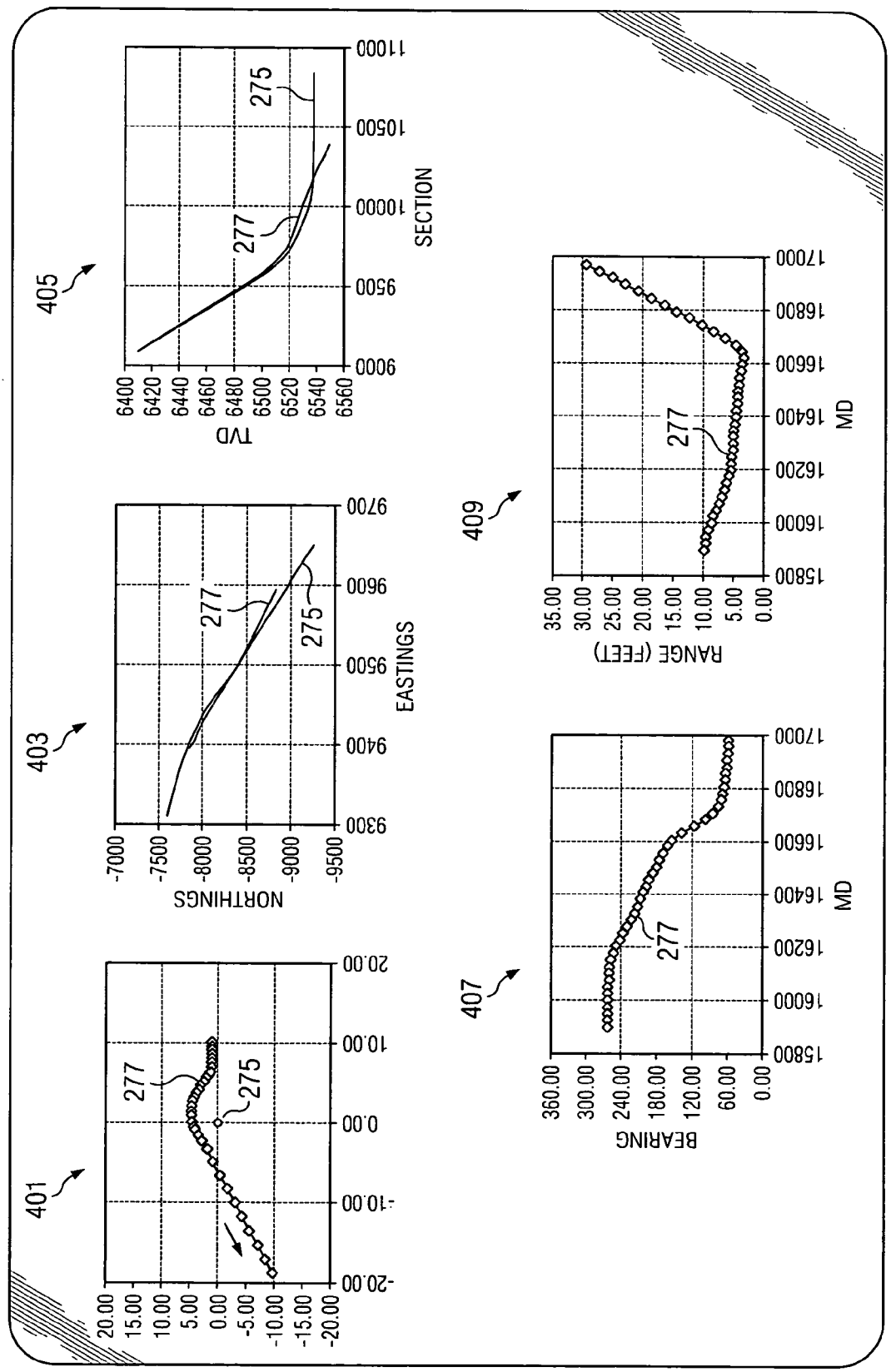
FIG. 13 is a display of a drilling plan for a hypothetical well twinning operation.

The principles of exemplary embodiments of this invention advantageously provide for planning various well drilling applications, such as well twinning and/or relief well applications, in which a measured well passes within sensory range of magnetic flux of a target well. Such planning may, for example, advantageously provide expected tool face to target values (also referred to as bearing) and distances (also referred to as range) between the measured and target wells as a function of measured depth. With reference to FIG. 13, one exemplary embodiment of a drilling plan 400 is shown for a hypothetical well twinning operation. The display may include, for example, conventional plan 403 and sectional 405 views of the measured 277 and target well 275. The display may also include, for example, a traveling cylinder view 401 looking down the target well, which is similar to that shown in FIGS. 4, 6, 7A, 7B, and 12, and plots of the tool face to target values 407 and distances 409 from the measured well to the target well.

At the beginning of the hypothetical operation shown, the measured well is essentially parallel with and to the right of the target well (having a tool face to target angle of about 260 degrees and a distance to the target well of about ten feet at a measured depth of about 15900 feet). The intent of the drilling operation is to remain essentially parallel with the target well for several hundred feet before crossing over and descending down and to the left of the target well. In the exemplary plan shown, the tool face to target value remains essentially unchanged to a measured depth of about 16200 feet. The measured well then builds slightly and crosses over the target well as shown in the traveling cylinder 401. At a measured depth of about 16600 feet the drilling plan has the measured well descending down and to the left away from the target well as shown making a closest approach to the target well at a range (distance) of about three feet at a bearing (TFT) of about 120 degrees. It will be appreciated that the drilling plan and the display shown in FIG. 13 are merely exemplary and that numerous variations thereof are available within the full scope of the invention. For example, displays including inclination, azimuth, and relative changes in the horizontal and vertical position of the measured well relative to the target well may alternatively and/or additionally be shown.

Embodiments of this invention may also be utilized in combination with other surveying techniques. For example, in applications in which the inclination of the target well is less than about 80 degrees, gravity azimuth methods (also referred to as gravity MWD), such as those described in the McElhinney patents, may be advantageously used to determine borehole azimuth values in the presence of magnetic interference. Such gravity MWD techniques are well suited for use with exemplary embodiments of this invention and may be advantageously utilized to determine Δx as described above. Alternatively and/or additionally, the magnetic field measurements may be utilized to determine magnetic azimuth values via known methods. Such magnetic azimuth values may be advantageously utilized at points along the measured well at which the magnetic interference is low, e.g., near a target well that has been sufficiently demagnetized.

Figure 14:
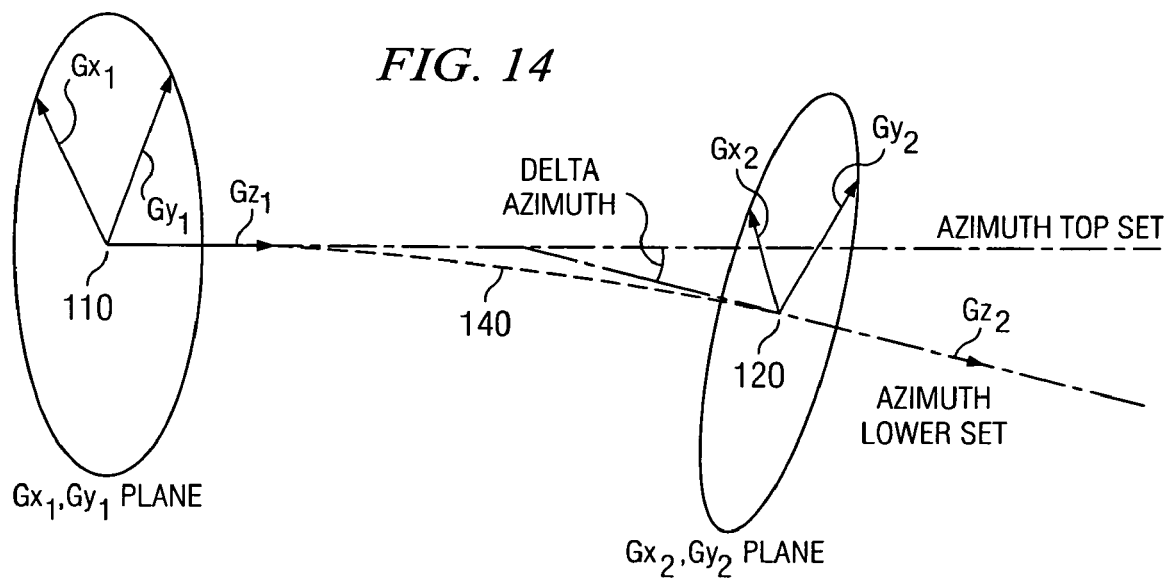
FIG. 14 is another diagrammatic representation of a portion of the MWD tool of FIG. 1 showing the change in azimuth between the upper and lower sensor sets.

In a previous commonly-assigned application (U.S. patent application Ser. No. 10/369,353) the applicant discloses methods for determining azimuth via gravity and magnetic field measurements using, for example, MWD tools such as that disclosed in FIG. 1. Referring now to FIGS. 2 and 14 (FIG. 14 is abstracted from U.S. patent application Ser. No.

10/369,353), the lower sensor set 120 has been moved with respect to upper sensor set 110 (by bending structure 140) resulting in a change in azimuth (denoted 'delta-azimuth' in FIG. 14). The following equations show how the foregoing methodology may be achieved. Note that this analysis assumes that the upper 110 and lower 120 sensor sets are rotationally fixed relative to one another.

The borehole inclination (Inc1 and Inc2) may be described at the upper 110 and lower 120 sensor sets, respectively, as follows:

$$Inc1 = \arctan\left(\frac{\sqrt{Gx1^2 + Gy1^2}}{Gz1}\right) \quad \text{Equation 16}$$

$$Inc2 = \arctan\left(\frac{\sqrt{Gx2^2 + Gy2^2}}{Gz2}\right) \quad \text{Equation 17}$$

where G represents a gravity sensor measurement (such as, for example, a gravity vector measurement), x, y, and z refer to alignment along the x, y, and z axes, respectively, and 1 and 2 refer to the upper 110 and lower 120 sensor sets, respectively. Thus, for example, Gx1 is a gravity sensor measurement aligned along the x-axis taken with the upper sensor set 110. The artisan of ordinary skill will readily recognize that the gravity measurements may be represented in unit vector form, and hence, Gx1, Gy1, etc., represent directional components thereof.

The borehole azimuth at the lower sensor set 120 may be described as follows:

BoreholeAzimuth=ReferenceAzimuth+DeltaAzimuth   Equation 18 where the reference azimuth is the azimuth value at the upper sensor set 110 and where:

and:

$$DeltaAzimuth = \frac{Beta}{1 - \mathrm{Sin}((Inc1+Inc2)/2)} \quad \text{and:} \quad \text{Equation 19}$$

$$Beta = \quad \text{Equation 20}$$

$$\arctan\left(\frac{(Gx2*Gy1 - Gy2*Gx1)*\sqrt{Gx1^2+Gy1^2+Gz1^2}}{Gz2*(Gx1^2+Gy1^2)+ \\ Gz1*(Gx2*Gx1+Gy2*Gy1)}\right)$$

Using the above relationships, a surveying methodology may be established, in which first and second gravity sensor sets (e.g., accelerometer sets) are disposed, for example, in a drill string. As noted above, surveying in this way is known to be serviceable and has been disclosed in U.S. Pat. No. 6,480,119 (the '119 patent). In order to utilize this methodology, however, a directional tie-in, i.e., an azimuthal reference, is required at the start of a survey. The subsequent surveys are then chain referenced to the tie-in reference. For example, if a new survey point (also referred to herein as a survey station) has a delta azimuth of 2.51 degrees, it is conventionally added to the previous survey point (e.g., 183.40 degrees) to give a new azimuth (i.e., borehole azimuth) of 185.91 degrees. A subsequent survey point having a delta azimuth of 1.17 degrees is again added to the previous survey point giving a new azimuth of 187.08 degrees.

If a new survey point is not exactly the separation distance between the two sensor packages plus the depth of the previous survey point, the prior art recognizes that extrapolation or interpolation may be used to determine the reference azimuth. However, extrapolation and interpolation techniques risk the introduction of error to the surveying results. These errors may become significant when long reference chains are required. Thus it is generally preferred to survey at intervals equal to the separation distance between the sensor sets, which tends to increase the time and expense required to perform a reliable survey, especially when the separation distance is relatively small (e.g., about 30 feet). It is therefore desirable to enhance the downhole surveying technique described above with supplemental referencing, thereby reducing (potentially eliminating for some applications) the need for tie-in referencing.

U.S. patent application Ser. No. 10/369,353 discloses method for utilizing supplemental reference data in borehole surveying applications. The supplemental reference data may be in substantially any suitable form, e.g., as provided by one or more magnetometers and/or gyroscopes. With continued reference to FIGS. 2 and 14, in one embodiment, the supplemental reference data are in the form of supplemental magnetometer measurements obtained at the upper sensor set 110. The reference azimuth value at the upper sensor set 110, may be represented mathematically, utilizing the supplemental magnetometer data, as follows:

$$ReferenceAzimuth = \quad \text{Equation 21}$$

$$\arctan\left(\frac{(Gx1*By1 - Gy1*Bx1)*\sqrt{Gx1^2+Gy1^2+Gz1^2}}{Bz1*(Gx1^2+Gy1^2) - \\ Gz1*(Gx1*Bx1 - Gy1*By1)}\right)$$

where Bx1, By1, and Bz1 represent the measured magnetic field readings in the x, y, and z directions, respectively, at the upper sensor set 110 (e.g., via magnetometer readings). The borehole azimuth at the lower sensor set 120 may thus be represented as follows:

$$BoreholeAzimuth = \arctan\left(\frac{(Gx1*By1 - Gy1*Bx1)* \\ \sqrt{Gx1^2+Gy1^2+Gz1^2}}{Bz1*(Gx1^2+Gy1^2) - \\ Gz1*(Gx1*Bx1 - Gy1*By1)}\right) + \quad \text{Equation 22}$$

$$\dots \frac{Beta}{1 - \mathrm{Sin}((Inc1+Inc2)/2)}$$

where Beta is given by Equation 20 and Inc1 and Inc2 are given by Equations 16 and 17, respectively, as described previously.

It will be appreciated that the above arrangement in which the upper sensor set 110 (FIGS. 1 through 3B) includes a set of magnetometers is merely exemplary. Magnetometer sets may likewise be disposed at the lower sensor set 120. For some applications, as described in more detail below, it may be advantageous to utilize magnetometer measurements at both the upper 110 and lower 120 sensor sets. Gyroscopes, or other direction sensing devices, may also be utilized to obtain supplemental reference data at either the upper 110 or lower 120 sensor sets.

It will also be appreciated that the above discussion relates to the generalized case in which each sensor set provides three gravity vector measurements, i.e., in the x, y, and z directions. However, it will also be appreciated that it is possible to take only two gravity vector measurements, such as, for example, in the x and y directions only, and to solve for the third vector using existing knowledge of the total gravitational field in the area. Likewise, in the absence of magnetic interference, it is possible to take only two magnetic field measurements and to solve for the third using existing knowledge of the total magnetic field in the area.

While the passive ranging techniques described herein require only a single magnetometer set (e.g., located at the upper sensor set as in the above example), it will be appreciated that passive ranging may be further enhanced via the use of a second set of magnetometers (i.e., a first set of magnetometers at the upper sensor set and a second set of magnetometers at the lower sensor set). The use of two sets of magnetometers, along with the associated accelerometers, typically improves data density (i.e., more survey points per unit length of the measured well), as shown in the examples described above, reduces the time required to gather passive ranging vector data, increases the quality assurance of the generated data, and builds in redundancy.

It will be understood that the aspects and features of the present invention may be embodied as logic that may be represented as instructions processed by, for example, a computer, a microprocessor, hardware, firmware, programmable circuitry, or any other processing device well known in the art. Similarly the logic may be embodied on software suitable to be executed by a processor, as is also well known in the art. The invention is not limited in this regard. The software, firmware, and/or processing device may be included, for example, on a down hole assembly in the form of a circuit board, on board a sensor sub, or MWD/LWD sub. Alternatively the processing system may be at the surface and configured to process data sent to the surface by sensor sets via a telemetry or data link system also well known in the art. Electronic information such as logic, software, or measured or processed data may be stored in memory (volatile or non-volatile), or on conventional electronic data storage devices such as are well known in the art.

The sensors and sensor sets referred to herein, such as accelerometers and magnetometers, are presently preferred to be chosen from among commercially available sensor devices that are well known in the art. Suitable accelerometer packages for use in service as disclosed herein include, for example, Part Number 979-0273-001 commercially available from Honeywell, and Part Number JA-5H175-1 commercially available from Japan Aviation Electronics Industry, Ltd. (JAE). Suitable magnetometer packages are commercially available called out by name from MicroTesla, Ltd., or under the brand name Tensor (TM) by Reuter Stokes, Inc. It will be understood that the foregoing commercial sensor packages are identified by way of example only, and that the invention is not limited to any particular deployment of commercially available sensors.

Although the present invention and its advantages have been described in detail, it should be understood that various changes, substitutions and alternations can be made herein without departing from the spirit and scope of the invention as defined by the appended claims.

I claim:

1. A method for surveying a borehole, the method comprising:
    (a) providing a downhole tool including first and second magnetic field measurement devices disposed at corresponding first and second positions in the borehole, the first and second positions selected to be within sensory range of magnetic flux from a target subterranean structure;
    (b) measuring local magnetic fields at the first and second positions using the corresponding first and second magnetic field measurement devices;
    (c) processing (1) the local magnetic fields at the first and second positions, and (2) a reference magnetic field, to determine a portion of the local magnetic fields attributable to the target subterranean structure;
    (d) generating interference magnetic field vectors at the first and second positions from the portion of the local magnetic fields attributable to the target subterranean structure; and
    (e) processing the interference magnetic field vectors to determine a tool face to target angle at each of the first and second positions, the tool face to target angles representing a corresponding direction from each of the first and second positions to the target subterranean structure; and
    (f) processing the tool face to target angles at the first and second positions to estimate a local change in direction of the borehole relative to the target subterranean structure.

2. The method of claim 1, wherein the target subterranean structure is a cased borehole.

3. The method of claim 1, wherein the downhole tool further comprises gravity measurement devices disposed at each of the first and second positions.

4. The method of claim 1, wherein the reference magnetic field is measured at a site substantially free of magnetic interference.

5. The method of claim 1, wherein the reference magnetic field is known based on a historical geological survey.

6. The method of claim 1, wherein the reference magnetic field is determined from a numerical model.

7. The method of claim 1, wherein (b) comprises measuring first and second magnetic field vectors at each of the first and second positions.

8. The method of claim 1, wherein (b) comprises measuring two-dimensional local magnetic fields at each of the first and second positions.

9. The method of claim 1, wherein (d) comprises generating two-dimensional interference magnetic field vectors at each of the first and second positions.

10. The method of claim 1, wherein x and y components of the reference magnetic field are determined according to the equations:

$$M_{EX} = H_E(\cos D \sin Az \cos R + \cos D \cos Az \cos Inc \sin R - \sin D \sin Inc \sin R)$$

$$M_{EY} = H_E(\cos D \cos Az \cos Inc \cos R + \sin D \sin Inc \cos R - \cos D \sin Az \sin R)$$

wherein Mex and Mey represent the x and y components of the reference magnetic field, respectively, He represents a magnitude of the reference magnetic field, D represents a magnetic dip of the reference magnetic field, Inc represents a local borehole inclination, Az represents a local borehole azimuth, and R represents a local rotation of the downhole tool.

11. The method of claim 10, wherein:
    the downhole tool further comprises gravity measurement devices disposed at each of the first and second positions; and Inc and R are determined via gravity measurements at the first and second positions.

12. The method of claim 10, wherein Az is determined from a historical survey of the target subterranean structure.

13. The method of claim 1, wherein (c) comprises determining a difference between the local magnetic field and the reference magnetic field at each of the first and second positions.

14. The method of claim 13, wherein:
x and y components of the reference magnetic field are determined according to the equations:

$$M_{EX} = H_E(\cos D \sin Az \cos R + \cos D \cos Az \cos Inc \sin R - \sin D \sin Inc \sin R)$$
$$M_{EY} = H_E(\cos D \cos Az \cos Inc \cos R + \sin D \sin Inc \cos R - \cos D \sin Az \sin R)$$

wherein Mex and Mey represent the x and y components of the reference magnetic field, respectively, He represents a magnitude of the reference magnetic field, D represents a magnetic dip of the reference magnetic field, Inc represents a local borehole inclination, Az represents a local borehole azimuth, and R represents a local rotation of the downhole tool; and the portion of the local magnetic field attributable to the target subterranean structure is determined according to the equations:

$$M_{IX} = B_X - M_{EX}$$
$$M_{IY} = B_Y - M_{EY}$$

wherein Mix and Miy represent x and y components, respectively, of the portion of the local magnetic field attributable to the target subterranean structure, and Bx and By represent x and y components of the local magnetic field, respectively.

15. The method of claim 14, wherein (c) further comprises subtracting another magnetic field component from the difference between the local magnetic field and the reference magnetic field.

16. The method of claim 1, wherein (e) comprises processing x and y components of the interference magnetic field vectors, the x and y components being orthogonal to a longitudinal axis of the borehole.

17. The method of claim 1, wherein the tool face to target angle at each of the first and second positions is determined according to the equation:

$$TFT = \arctan\left(\frac{M_{IX}}{M_{IY}}\right) + \arctan\left(\frac{Gx}{Gy}\right)$$

wherein TFT represents the tool face to target angle, Mix and Miy represent the x and y components, respectively, of the magnetic interference vector, and Gx and Gy represent x and y components of gravity vectors measured at at least one of the first and second positions.

18. The method of claim 1, further comprising:
(g) determining a tool face to target angle at a third position in the borehole by extrapolating the tool face to target angles at the first and second positions determined in (e).

19. The method of claim 18, wherein a drill bit assembly is located at the third position.

20. The method of claim 1, further comprising:
(g) displaying the tool face to target angles versus a measured depth of the borehole.

21. The method of claim 1, further comprising:
(g) processing the tool face to target angles determined in (e) and the local change in direction of the borehole determined in (f) to determine a subsequent direction of drilling the borehole.

22. The method of claim 1, further comprising:
(g) changing tool face by rotating the downhole tool in the borehole;
(h) repeating (b), (c), (d), and (e).

23. The method of claim 22, further comprising:
(i) comparing the tool face to target angles determined in (e) with the tool face to target angles determined in (h).

24. The method of claim 1, further comprising:
(g) processing the local magnetic fields at the first and second positions and the reference magnetic field to determine an interference magnetic dip at the first and second positions; and
(h) comparing the interference magnetic dips determined in (g) with the tool face to target angles determined in (e).

25. A method for surveying a borehole, the method comprising:
(a) providing a downhole tool including a magnetic field measurement device disposed at a first position in the borehole, the first position selected to be within sensory range of magnetic flux from the subterranean structure;
(b) measuring a local magnetic field at the first position using the magnetic field measurement device;
(c) re-positioning the tool at a second position in the borehole so that the magnetic field measurement device remains within sensory range of the magnetic flux from the subterranean structure;
(d) measuring a local magnetic field at the second position using the magnetic field measurement device;
(e) processing the local magnetic fields at the first and second positions and a reference magnetic field to determine a portion of the local magnetic fields attributable to the target subterranean structure;
(f) generating interference magnetic field vectors at the first and second positions from the portion of the local magnetic fields attributable to the target subterranean structure; and
(g) processing the interference magnetic field vectors to determine a tool face to target angle at each of the first and second positions, the tool face to target angles representing a direction from the first and second positions to the subterranean structure; and
(h) processing the tool face to target angles determined in (g) to determine a distance from at least one of the first and second positions in the borehole to the target subterranean structure.

26. The method of claim 25, further comprising:
(i) processing the tool face to target angles determined in (g) and the distance determined in (h) to determine a local azimuth of the borehole.

27. The method of claim 26, wherein (i) further comprises:
(1) processing the tool face to target angles determined in (g), the distance determined in (h), and a historical survey of the target well to the target subterranean structure to determine coordinates of the first and second positions in the borehole; and (2) processing the coordinates of the first and second positions in the borehole to determine a local azimuth of the borehole.

28. A method for determining distance from a borehole to a target subterranean structure, the method comprising:
    (a) providing a downhole tool including first and second magnetic field measurement devices disposed at corresponding first and second positions in the borehole, the first and second positions selected to be within sensory range of magnetic flux from the target subterranean structure;
    (b) measuring local magnetic fields at the first and second positions using the corresponding first and second magnetic field measurement devices;
    (c) processing (1) the local magnetic fields at the first and second positions, and (2) a reference magnetic field, to determine a portion of the local magnetic fields attributable to the target subterranean structure;
    (d) generating interference magnetic field vectors at the first and second positions from the portion of the local magnetic fields attributable to the target subterranean structure;
    (e) processing the interference magnetic field vectors to determine a tool face to target angle at each of the first and second positions; and
    (f) processing the tool face to target angles at the first and second positions to determine the distance from the borehole to the subterranean structure.

29. The method of claim 28, wherein the distance from the borehole to the target subterranean structure is determined independent of azimuth values at the first and second positions of the borehole.

30. The method of claim 28, wherein the distance from the borehole to the target subterranean structure between the first and second positions in the borehole is substantially inversely proportional to the difference between the tool face to target angles at the first and second positions.

31. The method of claim 28, wherein the distance from the borehole to the subterranean structure is substantially inversely proportional to the difference between the tangent of the tool face to target angle at the second position and the tangent of the tool face to target angle at the first position.

32. The method of claim 28, wherein (f) further includes processing at least one of a relative change in horizontal position and vertical position between the first and second positions in the borehole and corresponding first and second points on the target subterranean structure, said corresponding first and second points substantially orthogonal to a longitudinal axis of the borehole at the first and second positions in the borehole.

33. The method of claim 32, wherein distances from the first and second positions in the borehole to the target subterranean structure are determined according to a set of equations selected from the group consisting of:

$$d1 = \frac{-\Delta x - \Delta y \tan(TFT2)}{\cos(TFT1)[\tan(TFT2) - \tan(TFT1)]} \quad (1)$$

$$d2 = \frac{-\Delta x - \Delta y \tan(TFT1)}{\cos(TFT2)[\tan(TFT2) - \tan(TFT1)]};$$

$$d1 = \frac{-\Delta y \tan(TFT2)}{\cos(TFT1)[\tan(TFT2) - \tan(TFT1)]} \quad (2)$$

$$d2 = \frac{-\Delta y \tan(TFT1)}{\cos(TFT2)[\tan(TFT2) - \tan(TFT1)]};$$

$$d1 = \frac{-\Delta x}{\cos(TFT1)[\tan(TFT2) - \tan(TFT1)]} \quad (3)$$

$$d2 = \frac{-\Delta x}{\cos(TFT2)[\tan(TFT2) - \tan(TFT1)]}; \text{ and}$$

$$d1 = \frac{\Delta y}{\tan(\Delta TFT)} \quad (4)$$

$$d2 = \frac{-\Delta x}{\sin(\Delta TFT)};$$

wherein
d1 and d2 represent the distances from the first and second positions in the borehole to said corresponding first and second points on the target subterranean structure, TFT1 and TFT2 represent tool face to target angles at the first and second positions, respectively, $\Delta$TFT represents the difference between the tool face to target angles at the first and second positions, and $\Delta$x and $\Delta$y represent the relative changes in horizontal and vertical positions, respectively, between the first and second positions in the borehole and said corresponding first and second points on the target subterranean structure.

34. The method of claim 32, wherein a historical survey of the target subterranean structure is utilized to determine the relative change in horizontal position and the relative change in vertical position between the first and second positions in the borehole and said corresponding first and second points on the target subterranean structure.

35. The method of claim 32, wherein inclination values at the first and second positions in the borehole and at said corresponding first and second points on the target subterranean structure are utilized to determine the relative change in vertical position between the first and second positions in the borehole and said corresponding first and second points on the target subterranean structure.

36. The method of claim 35, wherein the relative change in vertical position between the first and second positions in the borehole and said corresponding first and second points on the target subterranean structure is determined according to the following equation:

$$\Delta y = \Delta MD\left(\sin\left(\frac{IncM1 + IncM2}{2} - \frac{IncT1 + IncT2}{2}\right)\right)$$

wherein $\Delta$y represents the relative change in vertical position between the first and second positions in the borehole and said corresponding first and second points on the target subterranean structure, $\Delta$MD represents a difference in measured depth between the first and second positions, IncM1 and IncM2 represent inclination values at the first and second positions in the borehole, and IncT1 and IncT2 represent inclination values at said corresponding first and second points on the target subterranean structure.

37. The method of claim 35, wherein the inclination values are determined via gravity measurements at the first and second positions.

38. The method of claim 32, wherein azimuth values at the first and second positions in the borehole and at said corresponding first and second points on the target subterranean structure are utilized to determine the relative change in horizontal position between the first and second positions in the borehole and said corresponding first and second points on the target subterranean structure.

39. The method of claim 38, wherein the relative change in horizontal position between the first and second positions in the borehole and said corresponding first and second points on the target subterranean structure is determined according to the following equation:

$$\Delta x = \Delta MD\left(\sin\left(\frac{AziM1 + AziM2}{2} - \frac{AziT1 + AziT2}{2}\right)\right)$$

wherein $\Delta x$ represents the relative change in horizontal position between the first and second positions in the borehole and said corresponding first and second points on the target subterranean structure, $\Delta MD$ represents a difference in measured depth between the first and second positions, AziM1 and AziM2 represent azimuth values at the first and second positions in the borehole, and AziT1 and AziT2 represent azimuth values at said corresponding first and second points on the target subterranean structure.

40. The method of claim 38, wherein the azimuth values are determined via gravity measurements at the first and second positions.

41. A method for determining a local azimuth of a borehole, the method comprising:
(a) providing a downhole tool including first and second magnetic field measurement devices disposed at corresponding first and second positions in the borehole, the first and second positions selected to be within sensory range of magnetic flux from a target subterranean structure;
(b) measuring local magnetic fields at the first and second positions using the corresponding first and second magnetic field measurement devices;
(c) processing (1) the local magnetic fields at the first and second positions, and (2) a reference magnetic field, to determine a portion of the local magnetic fields attributable to the target subterranean structure;
(d) generating interference magnetic field vectors at the first and second positions from the portion of the local magnetic fields attributable to the target subterranean structure;
(e) processing the interference magnetic field vectors to determine a tool face to target angle at each of the first and second positions; and
(f) processing the tool face to target angles at the first and second positions to determine a local azimuth of the borehole.

42. The method of claim 41, wherein (f) comprises:
(1) processing the tool face to target angles at the first and second positions to determine distance from the borehole to the target subterranean structure;
(2) processing the tool face to target angles at the first and second positions and the distance from the borehole to the target subterranean structure to determine coordinates of the first and second positions in the borehole; and
(3) processing the coordinates of first and second positions in the borehole to determine a local azimuth of the borehole.

43. The method of claim 42, wherein the coordinates of the first and second positions in the borehole are determined according to the following equations:
wherein PMx1 and $$PMx1 = PTx - d1\sin(TFT1)$$
wherein PMx1 and $PMy1 = PTy - d1\cos(TFT1)$
$$PMx2 = PTy - d2\sin(TFT2)$$
PMy1 represent x and y $PMy2 = PTy - d2\cos(TFT2)$ PMy1 represent x and y coordinates of the first position, PMx2 and PMy2 represent x and y coordinates of the second position, PTx and PTy represent x and y coordinates of the target subterranean structure, d1 and d2 represent distances from the first and second positions to the target subterranean structure, and TFT1 and TFT2 represent tool face to target angles between the first and second positions and the target subterranean structure.

44. The method of claim 42, wherein the local azimuth of the borehole is determined according to the following equation:

$$AzM = \arctan\left(\frac{Cy2 - Cy1}{Cx2 - Cx1}\right)$$

where AzM represents the local azimuth of the borehole, Cx1 and Cy1 represent x and y coordinates of the first position, and Cx2 and Cy2 represent x and y coordinates of the second position.

45. A method for drilling a borehole along a predetermined course relative to a target subterranean structure, at least a portion of the borehole being within sensory range of magnetic flux from the target subterranean structure, the method comprising:
(a) providing a downhole tool including first and second magnetic field measurement devices disposed at corresponding first and second positions in the borehole, the first and second positions selected to be within sensory range of magnetic flux from the target subterranean structure;
(b) measuring local magnetic fields at the first and second positions using the corresponding first and second magnetic field measurement devices;
(c) processing (1) the local magnetic fields at the first and second positions, and (2) a reference magnetic field, to determine a portion of the local magnetic fields attributable to the subterranean target well;
(d) generating interference magnetic field vectors at the first and second positions from the portion of the local magnetic fields attributable to the target subterranean target well;
(e) processing the interference magnetic field vectors to determine a tool face to target angle at each of the first and second positions;
(f) processing the tool face to target angles at the first and second positions determined in (e) to determine a direction for subsequent drilling of the borehole; and
(g) drilling the borehole along the direction for subsequent drilling determined in (f) such that the downhole tool is repositioned at a new locus in the borehole, and the first and second positions are repositioned at corresponding new loci, the first and second magnetic field measurement devices remaining within sensory range of magnetic flux from the subterranean structure; and
(h) repeating (b), (c), (d), (e), (f), and (g).

46. The method of claim 45, wherein at least a portion of the target subterranean structure occupies pre-known subterranean space, the method further comprising:
(i) pre-generating a drilling plan for the borehole in view of the pre-known subterranean space, the drilling plan including projected tool face to target angles between the borehole and the target subterranean structure at a plurality of selected loci along the borehole.

47. The method of claim 46, wherein (f) comprises processing the tool face to target angles determined in (e) and the projected tool face to target angles in the drilling plan pre-generated in (i) to determine a direction of subsequent drilling of the borehole relative to the target subterranean structure.

48. The method of claim 45, wherein (f) further comprises:
processing the tool face to target angles at the first and second positions determined in (e) to determine distance from the borehole to the target subterranean structure.

49. The method of claim 45, wherein (f) further comprises:
(1) processing the tool face to target angles at the first and second positions determined in (e) to determine distance from the borehole to the target subterranean structure;
(2) processing the tool face to target angles at the first and second positions and the distance from the borehole to the target subterranean structure to determine coordinates of the first and second positions on the borehole; and
(3) processing the coordinates of first and second positions on the borehole to determine a local azimuth of the borehole.

50. A system for determining the location of a target subterranean structure from within an adjacent borehole, said subterranean structure generating magnetic flux, the system comprising:
a down hole tool including first and second magnetic field measurement devices deployed thereon, the tool operable to be positioned in a borehole such that the first and second magnetic field measurement devices are located at corresponding first and second positions in the borehole, the first and second positions selected to be within sensory range of magnetic flux from the subterranean structure; and
a processor configured to determine:
(A) local magnetic fields at the first and second positions as measured using the corresponding first and second magnetic field measurement devices;
(B) a portion of the local magnetic fields attributable to the subterranean structure at each of the first and second positions, said portion determined from the local magnetic fields in (A) and a reference magnetic field made available to the processor;
(C) an interference magnetic field vector at each of the first and second positions, each of the interference magnetic field vectors corresponding to the portion of the local magnetic fields determined in (B);
(D) a tool face to target angle at each of the first and second positions, the tool face to target angles representing a corresponding direction from first and second positions in the borehole to the subterranean structure; and
(E) a local change in direction of the borehole relative to the target subterranean structure.

51. The system of claim 50, comprising first and second gravity measurement devices disposed at the first and second positions, respectively.

52. The system of claim 50, wherein:
each of the magnetic field measurement devices comprises first, second, and third magnetometers; and
each of the gravity measurement devices comprises first, second, and third accelerometers.

53. A computer system comprising:
at least one processor; and
a storage device having computer-readable logic stored thereon, the computer-readable logic accessible by and intelligible to the processor;
the processor further disposed to receive input from first and second magnetic field measurement devices when said first and second magnetic field measurement devices are deployed on a downhole tool at corresponding first and second positions in a borehole, the first and second positions selected to be within sensory range of magnetic flux generated by a target subterranean structure located outside the borehole,
the computer-readable logic further configured to instruct the processor to execute a method for determining the location of the target subterranean structure, the method comprising:
(a) determining a local magnetic field at each of the first and second positions based on input from the corresponding first and second magnetic field measurement devices;
(b) determining a portion of the local magnetic field attributable to the subterranean structure at each of the first and second positions, said portion determined from the local magnetic fields in (a) and a reference magnetic field made available to the processor;
(c) calculating an interference magnetic field vector for each of the first and second positions, each of the interference magnetic field vectors corresponding to the portion of the local magnetic fields determined in (b);
(d) determining tool face to target angles at each of the first and second positions, the tool face to target angles representing a corresponding direction between the first and second positions in the borehole to the subterranean structure; and
(e) processing the tool face to target angles at the first and second positions to estimate a local change in direction of the borehole relative to the target subterranean structure.

54. The computer system of claim 53, wherein the portion of the total magnetic field attributable to the subterranean structure at each locus in (b) is determined by the equations:

$$M_{IX} = B_X - M_{EX}$$

$$M_{IY} = B_Y - M_{EY}$$

wherein Mix and Miy represent x and y components, respectively, of the portion of the total magnetic field attributable to the subterranean structure, and Bx and By represent x and y components of the total magnetic field determined in (a), and Mex and Mey represent the x and y components of the reference magnetic field.

55. The computer system of claim 53, wherein the tool face to target angle at each of the first and second positions is determined in (d) according to the equation:

$$TFT = \arctan\left(\frac{M_{IX}}{M_{IY}}\right) + \arctan\left(\frac{Gx}{Gy}\right)$$

wherein TFT represents the tool face to target angle, Mix and Miy represent the x and y components, respectively, of the magnetic interference vector, and Gx and Gy represent x and y components of gravity vectors measured at at least one of the first and second positions.

56. The computer system of claim 53, wherein the computer system further comprises a display apparatus and the method further comprises (f) displaying the tool face to target angles versus a measured depth of the borehole.

57. The computer system of claim 55, wherein the method further comprises:

(f) processing the tool face to target angles determined in (d) and the local change in direction of the borehole determined in (e) to determine a subsequent direction of drilling the borehole.

58. The computer system of claim 53, wherein the method further comprises:

(f) processing the tool face to target angles determined in (d) to determine distances from the first and second positions in the borehole to the subterranean structure.

59. The computer system of claim 58, wherein the distances from the first and second positions in the borehole to the subterranean structure are determined according to a set of equations selected from the group consisting of:

$$d1 = \frac{-\Delta x - \Delta y \tan(TFT2)}{\cos(TFT1)[\tan(TFT2) - \tan(TFT1)]} \quad (1)$$
$$d2 = \frac{-\Delta x - \Delta y \tan(TFT1)}{\cos(TFT2)[\tan(TFT2) - \tan(TFT1)]};$$

$$d1 = \frac{-\Delta y \tan(TFT2)}{\cos(TFT1)[\tan(TFT2) - \tan(TFT1)]} \quad (2)$$
$$d2 = \frac{-\Delta y \tan(TFT1)}{\cos(TFT2)[\tan(TFT2) - \tan(TFT1)]};$$

$$d1 = \frac{-\Delta x}{\cos(TFT1)[\tan(TFT2) - \tan(TFT1)]} \quad (3)$$
$$d2 = \frac{-\Delta x}{\cos(TFT2)[\tan(TFT2) - \tan(TFT1)]}; \text{ and}$$

$$d1 = \frac{\Delta y}{\tan(\Delta TFT)} \quad (4)$$
$$d2 = \frac{-\Delta x}{\sin(\Delta TFT)};$$

wherein d1 and d2 represent the distances from the first and second positions in the borehole to the target subterranean structure, TFT1 and TFT2 represent tool face to target angles at the first and second positions, respectively, ΔTFT represents the difference between the tool face to target angles at the first and second positions, and Δx and Δy represent the relative changes in horizontal and vertical positions, respectively, between the first and second positions in the borehole and corresponding first and second points on the subterranean structure, said corresponding first and second points substantially orthogonal to a longitudinal axis of the borehole at the first and second positions in the borehole.

60. The computer system of claim 59, wherein Δx and Δy are determined according to the following equations:

$$\Delta x = \Delta MD\left(\sin\left(\frac{AziM1 + AziM2}{2} - \frac{AziT1 + AziT2}{2}\right)\right)$$
$$\Delta y = \Delta MD\left(\sin\left(\frac{IncM1 + IncM2}{2} - \frac{IncT1 + IncT2}{2}\right)\right)$$

wherein ΔMD represents a difference in measured depth between the first and second positions, IncM1 and IncM2 and AziM1 and AziM2 represent inclination and azimuth values, respectively, at the first and second positions in the borehole, and IncT1 and IncT2 and AziT1 and AziT2 represent inclination and azimuth values, respectively, at said corresponding first and second points on the subterranean structure.

61. The computer system of claim 53, wherein the method further comprises:

(f) processing the tool face to target angles determined in (d) to determine distance from the borehole to the subterranean structure;

(g) processing the tool face to target angles determined in (d) and the distance from the borehole to the subterranean structure determined in (f) to determine coordinates of the first and second positions in the borehole; and (h) processing the coordinates of first and second positions in the borehole determined in (g) to determine a local azimuth of the borehole.

62. The computer system of claim 61, wherein:

the coordinates of the first and second positions in the borehole are determined in (f) according to the following equations:

$$PMx1 = PTx - d1\sin(TFT1)$$
$$PMy1 = PTy - d1\cos(TFT1)$$
$$PMx2 = PTy - d2\sin(TFT2)$$
$$PMy2 = PTy - d2\cos(TFT2)$$

wherein PMx1 and PMy1 represent x and y coordinates of the first position, PMx2 and PMy2 represent x and y coordinates of the second position, PTx and PTy represent x and y coordinates of the subterranean structure, d1 and d2 represent distances from the first and second positions to the subterranean structure, and TFT1 and TFT2 represent tool face to target angles between the first and second positions and the subterranean structure; and wherein the local azimuth of the borehole is determined in (g) according to the following equation:

$$AzM = \arctan\left(\frac{Cy2 - Cy1}{Cx2 - Cx1}\right)$$

where AzM represents the local azimuth of the borehole, Cx1 and Cy1 represent x and y coordinates of the first position in a conventional coordinates system, and Cx2 and Cy2 represent x and y coordinates of the first position in the conventional coordinates system.

63. A method for estimating a distance from a borehole to a target subterranean structure, the method comprising:
  (a) providing a downhole tool including first and second magnetic field measurement devices disposed at corresponding first and second positions in the borehole, the first and second positions selected to be within sensory range of magnetic flux from the target subterranean structure;
  (b) measuring local magnetic fields at the first and second positions using the corresponding first and second magnetic field measurement devices;
  (c) processing (1) the local magnetic fields at the first and second positions, and (2) a reference magnetic field, to determine a portion of the local magnetic fields attributable to the target subterranean structure;
  (d) generating interference magnetic field vectors at the first and second positions from the portion of the local magnetic fields attributable to the target subterranean structure;
  (e) processing the interference magnetic field vectors to determine a tool face to target angle at each of the first and second positions; and
  (f) comparing the tool face to target angles at the first and second positions determined in (e) to estimate the distance from the borehole to the subterranean structure.

64. The method of claim 63, wherein the distance estimated in (f) is substantially inversely proportional to a difference between the tool face to angles at the first and second positions.

* * * * *